(12) United States Patent
Kim et al.

(10) Patent No.: US 12,225,418 B2
(45) Date of Patent: Feb. 11, 2025

(54) METHOD AND APPARATUS FOR MOBILITY MANAGEMENT IN WIRELESS COMMUNICATION SYSTEM

(71) Applicant: LG Electronics Inc., Seoul (KR)

(72) Inventors: Hongsuk Kim, Seoul (KR); Sunyoung Lee, Seoul (KR); Youngdae Lee, Seoul (KR); Yejee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 505 days.

(21) Appl. No.: 17/414,599

(22) PCT Filed: Dec. 27, 2019

(86) PCT No.: PCT/KR2019/018598
§ 371 (c)(1),
(2) Date: Jun. 16, 2021

(87) PCT Pub. No.: WO2020/139015
PCT Pub. Date: Jul. 2, 2020

(65) Prior Publication Data
US 2022/0053388 A1    Feb. 17, 2022

(30) Foreign Application Priority Data
Dec. 28, 2018  (KR) ................. 10-2018-0172898

(51) Int. Cl.
*H04W 36/00*  (2009.01)
*H04W 76/27*  (2018.01)

(52) U.S. Cl.
CPC ... *H04W 36/0058* (2018.08); *H04W 36/0044* (2013.01); *H04W 36/0061* (2013.01); *H04W 76/27* (2018.02)

(58) Field of Classification Search
CPC ....... H04W 36/0058; H04W 36/00837; H04W 36/0044; H04W 36/0061
See application file for complete search history.

(56) References Cited

U.S. PATENT DOCUMENTS

| 2008/0220784 | A1* | 9/2008 | Somasundaram ........................... H04W 36/00837 455/67.11 |
| 2010/0240367 | A1* | 9/2010 | Lee ................... H04W 36/0077 455/435.2 |
| 2013/0260811 | A1 | 10/2013 | Rayavarapu |
| 2022/0053384 | A1* | 2/2022 | Pugeat ................. H04W 36/36 |

FOREIGN PATENT DOCUMENTS

| KR | 1020180118047 | 10/2018 | |
| WO | WO2017163676 | 9/2017 | |
| WO | WO-2018230997 A1 * | 12/2018 | ........ H04W 36/0061 |

* cited by examiner

*Primary Examiner* — Saad A. Waqas
(74) *Attorney, Agent, or Firm* — Fish & Richardson P.C.

(57) ABSTRACT

The present disclosure relates to mobility management wireless communications. According to an embodiment of the present disclosure, a method performed by a wireless device in a wireless communication system comprises: receiving, from a source cell, a handover command comprising a handover validity timer; performing a handover attempt to a target cell while the handover validity timer is running; and transmitting, to the source cell, a report message comprising cell information including target cell information for the target cell upon an expiration of the handover validity timer.

13 Claims, 19 Drawing Sheets

METHOD AND APPARATUS FOR MOBILITY MANAGEMENT IN WIRELESS COMMUNICATION SYSTEM

CROSS-REFERENCE TO RELATED APPLICATIONS

This application is a National Stage application under 35 U.S.C. § 371 of International Application No. PCT/KR2019/018598, filed on Dec. 27, 2019, which claims the benefit of Korean Patent Application No. 10-2018-0172898, filed on Dec. 28, 2018. The disclosures of the prior applications are incorporated by reference in their entirety.

BACKGROUND OF THE DISCLOSURE

Field of the Disclosure

The present disclosure relates to mobility management wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a wireless device and/or user equipment (UE) may move along cells/base stations deployed in a wide range of areas. To provide proper services to the wireless device, the network should manage a mobility of the wireless device. For example, the network may control a handover of the wireless device from a source cell to a target cell. For the handover control by the network, the wireless may need to report some information to the network, such as measurement results on neighbor cells around the wireless device.

SUMMARY OF THE DISCLOSURE

Technical Problem

An aspect of the present disclosure is to provide method and apparatus for mobility management in a wireless communication system.

Another aspect of the present disclosure is to provide method and apparatus for performing a handover in a wireless communication system.

Another aspect of the present disclosure is to provide method and apparatus for performing a conditional handover in a wireless communication system.

Another aspect of the present disclosure is to provide method and apparatus for reporting a result of a handover trial/attempt to a network in a wireless communication system.

Technical Solution

According to an embodiment of the present disclosure, a method performed by a wireless device in a wireless communication system comprises: receiving, from a source cell, a handover command comprising a handover validity timer; performing a handover attempt to a target cell while the handover validity timer is running; and transmitting, to the source cell, a report message comprising cell information including target cell information for the target cell upon an expiration of the handover validity timer.

According to an embodiment of the present disclosure, a wireless device in a wireless communication system comprises: a memory; a transceiver; and at least one processor operatively coupled to the memory and the transceiver. The at least one processor is configured to control the transceiver to receive, from a source cell, a handover command comprising a handover validity timer, perform a handover attempt to a target cell while the handover validity timer is running, and control the transceiver to transmit, to the source cell, a report message comprising cell information upon an expiration of the handover validity timer.

Advantageous Effect

The present disclosure can have various advantageous effects.

For example, the wireless device may provide neighbor/candidate cell information to a network right after an expiry of a handover validity timer, the network can figure out the specific status of the wireless device to perform mobility. Further, the network can recognize which neighbor/candidate cells still have potential to perform a mobility and the network can make better decision to provide configuration on a handover.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
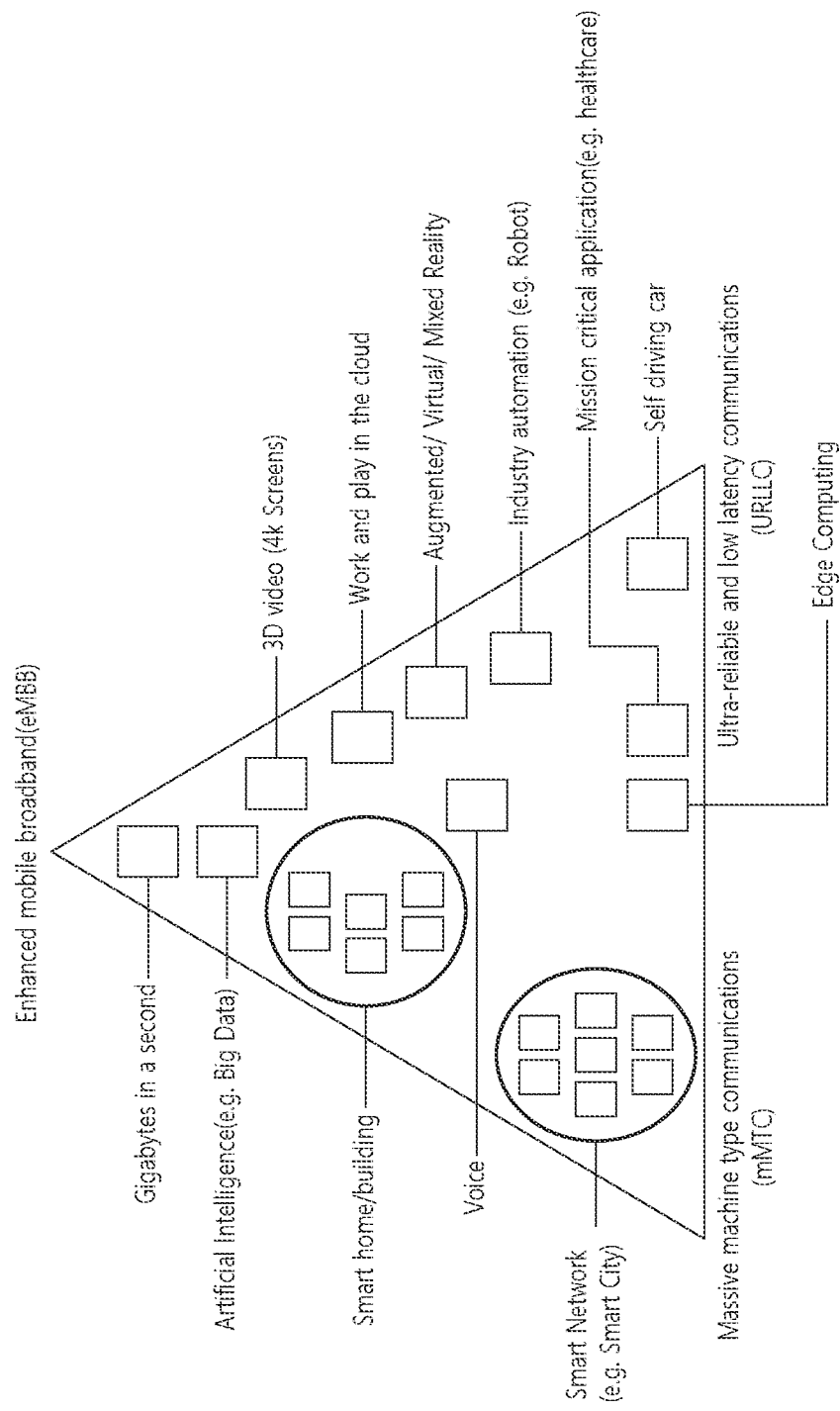
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The terms used throughout the disclosure can be defined as follows:

Handover condition (or, handover trigger condition) refers to a condition that should be satisfied for triggering a handover. Handover condition comprises at least one of a handover event, time-to-trigger (TTT), offset value, or threshold value(s). The handover condition for a handover event is satisfied when an entering condition for the handover event is satisfied for at least the TTT. For example, the entering condition for the event A3 is satisfied if a signal quality for a target cell is better than that for a source cell by more than or equal to the offset value. For another example, the entering condition for the event A5 is satisfied if a signal quality for a target cell is better than a first threshold and a signal quality for a source cell is lower than a second threshold.

Occurrence condition for a handover event refers to a condition that should be satisfied for the handover event to occur. The occurrence condition for the handover event comprises at least one of the handover event, TTT, offset value, or threshold values. The occurrence condition for the handover event is satisfied if an entering condition for the handover event is satisfied for at least the TTT. The occurrence condition for the handover event may comprise the handover condition for the handover event.

Event entering status for handover event indicates whether an entering condition for the handover event is satisfied or not satisfied. 'Event entering status for a handover event: YES' indicates that an entering condition for the handover event is satisfied. 'Event entering status for a handover event: NO' indicates that an entering condition for the handover event is not satisfied.

Event leaving status for handover event indicates whether a leaving condition for the handover event is satisfied or not satisfied. 'Event leaving status for a handover event: YES' indicates that a leaving condition for the handover event is satisfied. 'Event leaving status for a handover event: NO' indicates that a leaving condition for the handover event is not satisfied. A leaving condition for the event A3 is satisfied if a signal quality for a target cell is not better than that for a source cell by more than or equal to the offset value. A leaving condition for the event A5 is satisfied if a signal quality for a target cell is not better than a first threshold or a signal quality for a source cell is not lower than a second threshold. A leaving condition for handover event being satisfied can also be referred to as the handover event leaving.

TTT counting status for handover event indicates an amount of time period or a portion of TTT during which an entering condition for the handover event is satisfied.

Network controlled handover: UE may receive a handover command comprising a single target cell from a network and perform a handover (or, handover attempt) to the target cell indicated by the network. This handover may be referred to as 'network controlled handover', and the handover command related to the network controlled handover may be referred to as 'network controlled handover command'.

Conditional handover: UE may receive a handover command comprising a list of candidate target cells (or simply referred to as candidate cells) and handover condition(s), and autonomously perform a handover (or, handover attempt) to a target cell among the candidate cells for which a handover condition is satisfied. This handover may be referred to as 'conditional handover', and the handover command related to the conditional handover may be referred to as 'conditional handover command'. For the conditional handover, the UE may autonomously select the target cell among the candidate cells based on measurements on the candidate cells.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
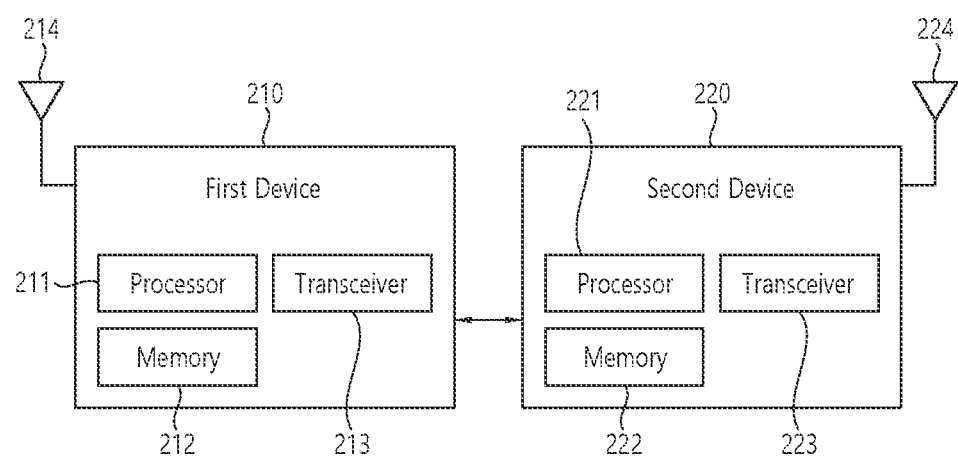
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
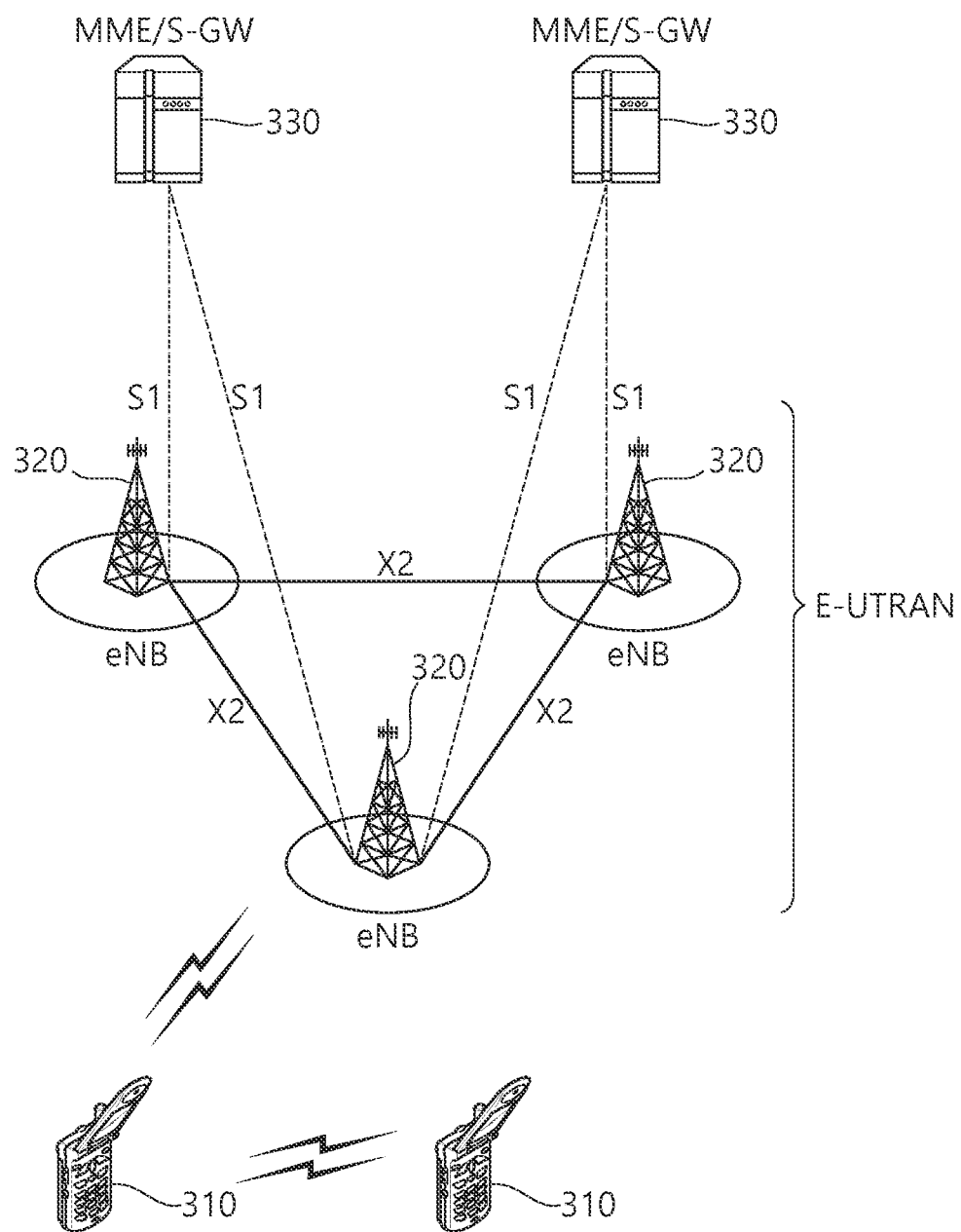
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), and a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
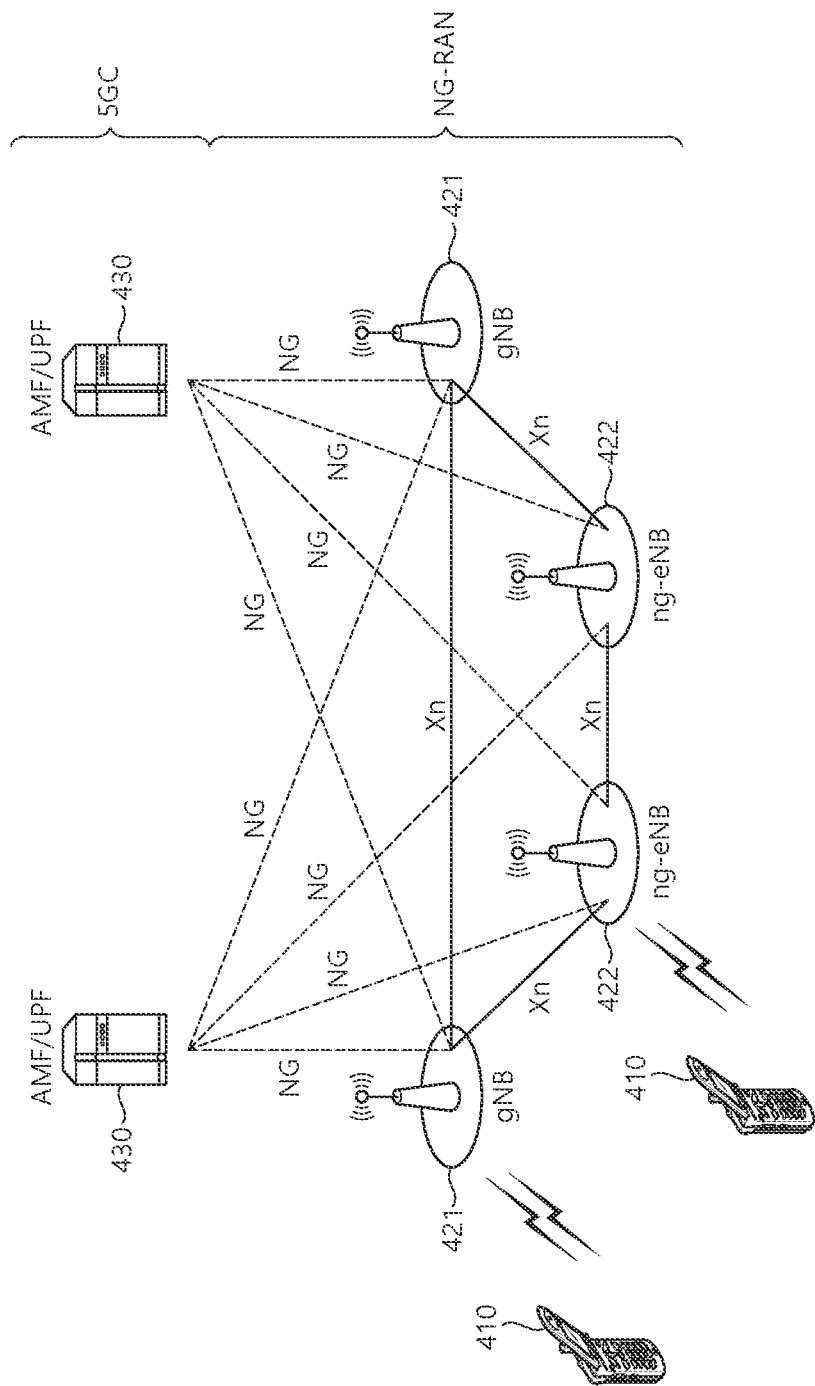
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
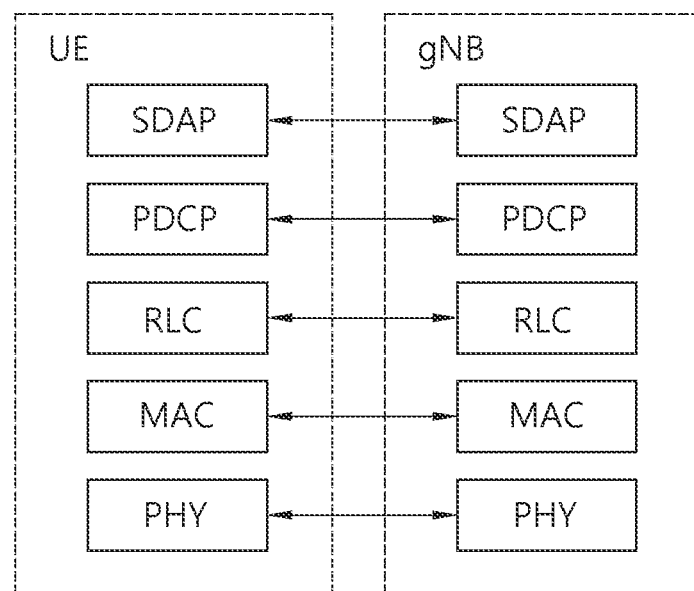
FIG. 5 shows a block diagram of a user plane protocol stack to which the technical features of the present disclosure can be applied.
Figure 6:
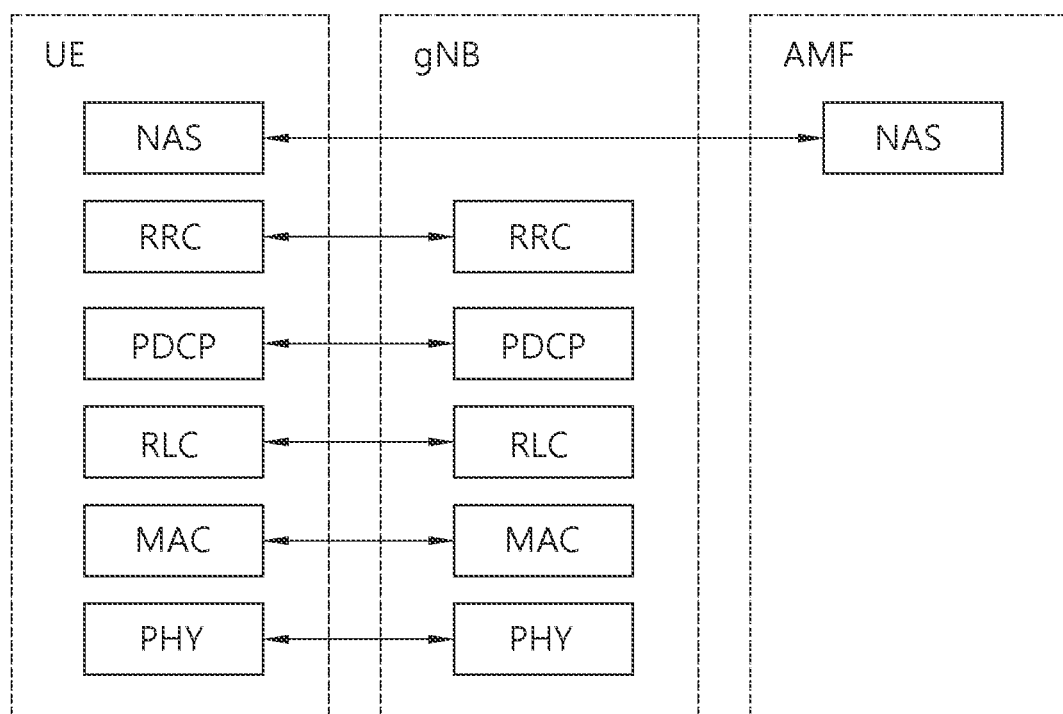
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
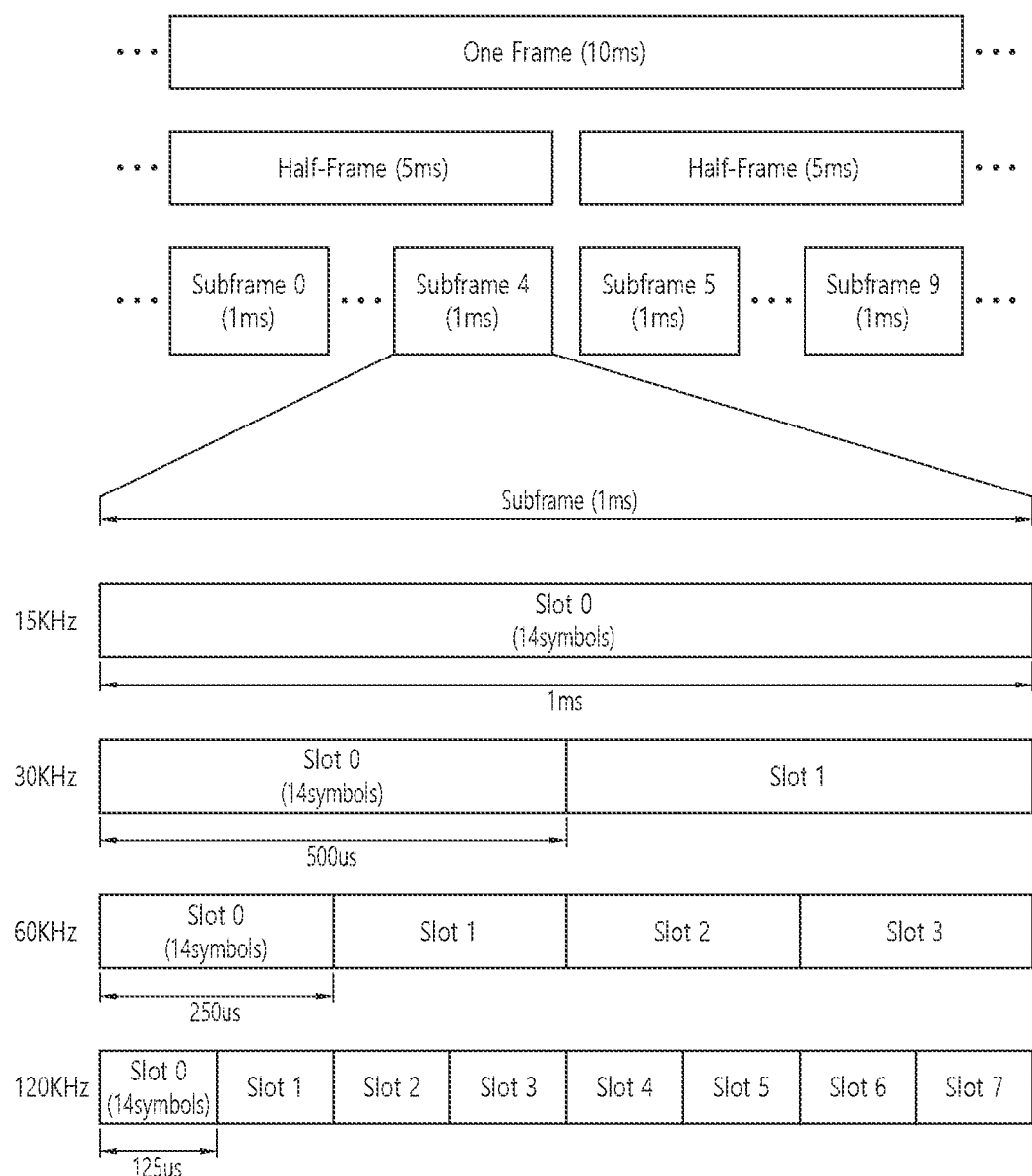
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz. The following table shows the number of OFDM symbols per slot, the number of slots per frame, and the number of slots per for the normal CP, according to the subcarrier spacing $\Delta f = 2u*15$ kHz.

TABLE 3

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2u*15$ kHz.

TABLE 4

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$ where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
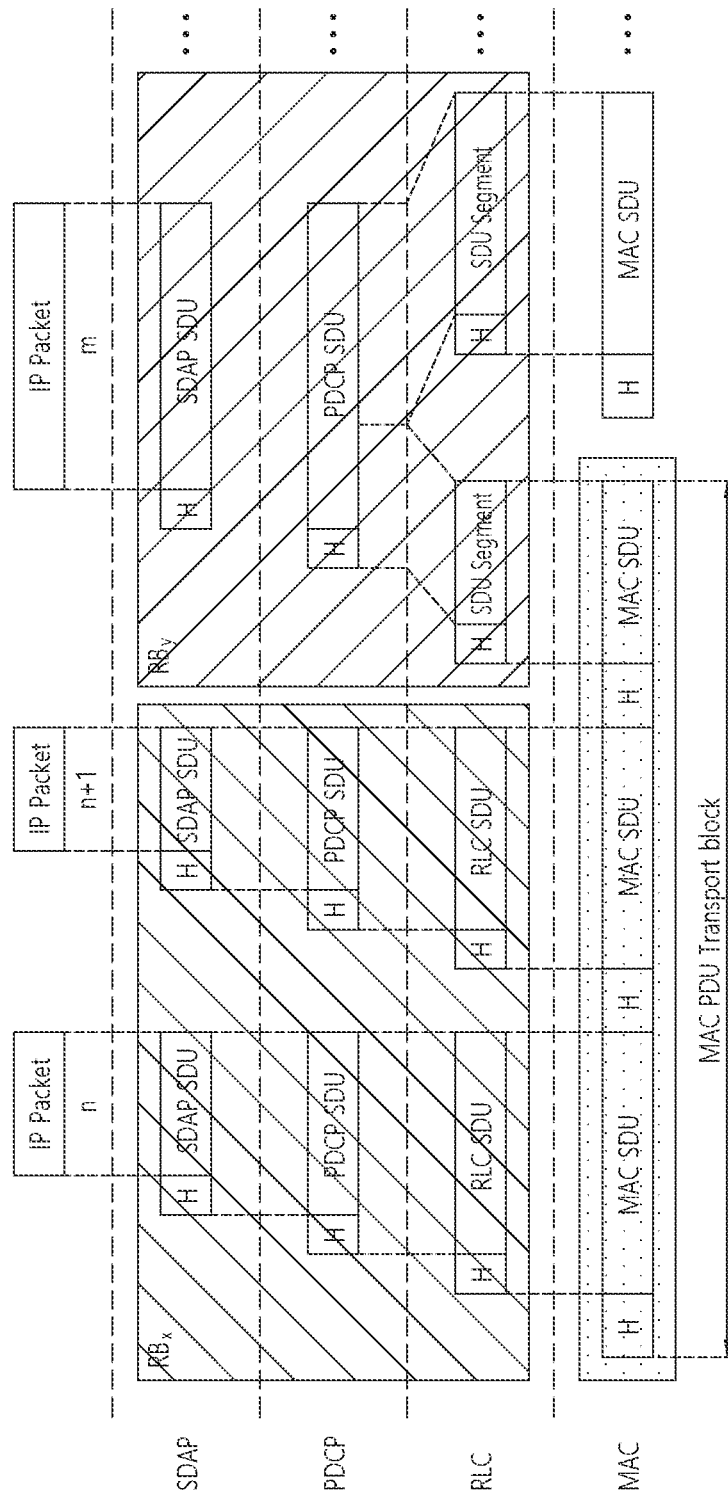
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 9:
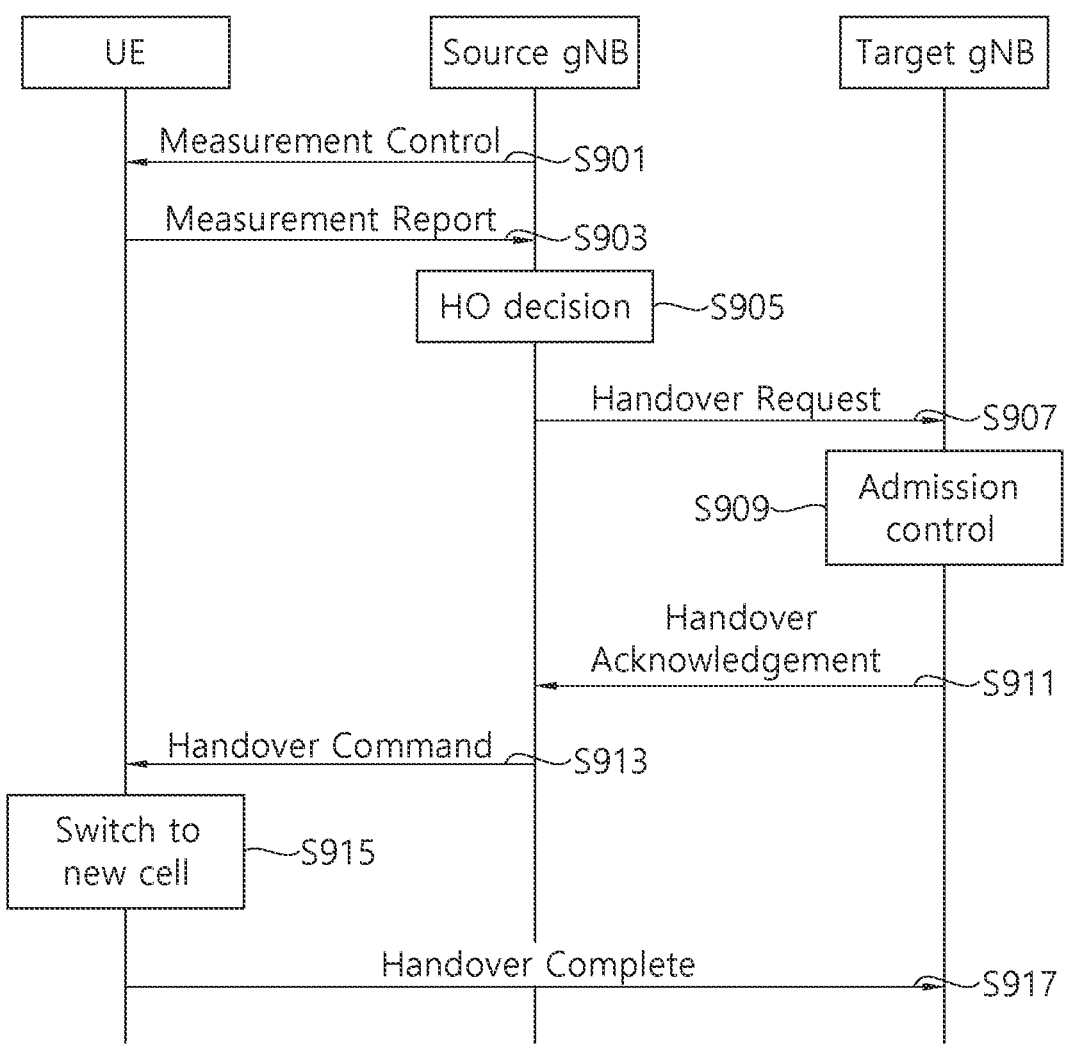
FIG. 9 shows an example of network controlled handover procedure to which technical features of the present disclosure can be applied.

FIG. 9 shows an example of network controlled handover procedure to which technical features of the present disclosure can be applied. Throughout the disclosure, gNB can be substituted for eNB, cell, or base station.

Referring to FIG. 9, in step S901, the source gNB may transmit measurement control message to the UE. The source gNB may configure the UE measurement procedures according to the roaming and access restriction information and, for example, the available multiple frequency band information through the measurement control message. Measurement control information provided by the source gNB through the measurement control message may assist the function controlling the UE's connection mobility.

In step S903, the UE may transmit a measurement report message to the source gNB. The measurement report message may comprise a result of measurement on neighbor cell(s) around the UE which can be detected by the UE. The UE may generate the measurement report message according to a measurement configuration and/or measurement control information in the measurement control message received in step S901.

In step S905, the source gNB may make a decision based on the measurement report message and/or radio resource management (RRM) information to hand of the UE to, for example, the target gNB.

In step S907, the source gNB may transmit a handover request message to the target gNB passing necessary information to prepare the handover at the target side (UE X2 signalling context reference at source gNB, UE S1 EPC signalling context reference, target cell ID, $K_{eNB*}$, RRC context including the C-RNTI of the UE in the source gNB, AS-configuration, E-RAB context and physical layer ID of the source cell+short MAC-I for possible RLF recovery). UE X2/UE S1 signalling references enable the target gNB to address the source gNB and the EPC. The E-RAB context includes necessary RNL and TNL addressing information, and QoS profiles of the E-RABs.

In step S909, the target gNB may perform admission control, based on the received E-RAB QoS information to increase the likelihood of a successful handover, if the resources can be granted by target gNB. The target gNB may configure the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

In step S911, the target gNB prepares handover with L1/L2 and sends the handover request acknowledge message to the source gNB. The handover request acknowledge message may include a transparent container to be sent to the UE as an RRC message to perform the handover. The container may include a new C-RNTI, target gNB security algorithm identifiers for the selected security algorithms, may include a dedicated RACH preamble, and possibly some other parameters i.e. access parameters, SIBs. If RACH-less handover is configured, the container may include timing adjustment indication and optionally a pre-allocated uplink grant. The handover request acknowledge message may also include RNL/TNL information for the forwarding tunnels, if necessary. As soon as the source gNB receives the handover request acknowledge message, or as soon as the transmission of the handover command is initiated in the downlink, data forwarding may be initiated.

In step S913, the source gNB may transmit a handover command which may be a RRC message, to the UE. The target gNB may generate the RRC message to perform the handover, i.e. RRCConnectionReconfiguration message including the mobilityControlInformation, to be sent by the source gNB towards the UE. The source gNB may perform the necessary integrity protection and ciphering of the message. The UE may receive the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the handover. If RACH-less handover is configured, the RRCConnectionReconfiguration may include timing adjustment indication and optionally preallocated uplink grant for accessing the target gNB. If preallocated uplink grant is not included, the UE should monitor PDCCH of the target gNB to receive an uplink grant. The UE may not need to delay the handover execution for delivering the HARQ/ARQ responses to source gNB. If Make-Before-Break HO is configured, the connection to the source cell may be maintained after the reception of RRCConnectionReconfiguration message with mobilityControlInformation before the UE executes initial uplink transmission to the target cell.

In step S915, the UE may switch to a new cell i.e., the target gNB. The UE may detach from the old cell i.e., the source gNB and synchronize to a new cell i.e., the target gNB.

In step S917, the UE may transmit a handover complete message (i.e., RRCConnectionReconfigurationComplete message) to the source gNB. When the UE has successfully accessed the target cell or received uplink grant when RACH-less HO is configured, the UE may send the RRCConnectionReconfigurationComplete message comprising a C-RNTI to confirm the handover, along with an uplink Buffer Status Report, whenever possible, to the target gNB to indicate that the handover procedure is completed for the UE. The target gNB may verify the C-RNTI sent in the RRCConnectionReconfigurationComplete message. The target gNB can now begin sending data to the UE.

It is expected that channel conditions in a wireless communication system (e.g., NR) changes rapidly considering especially in beamforming system in high frequencies. This would put obstacles in UE performing RRC level handover procedures. In this situation, higher handover performance degradation may also be observed. In order to overcome this degradation, it is necessary to study a mechanism to overcome the shortcoming of the network controlled handover procedure as illustrated in FIG. 9 in high frequency environment.

Figure 10:
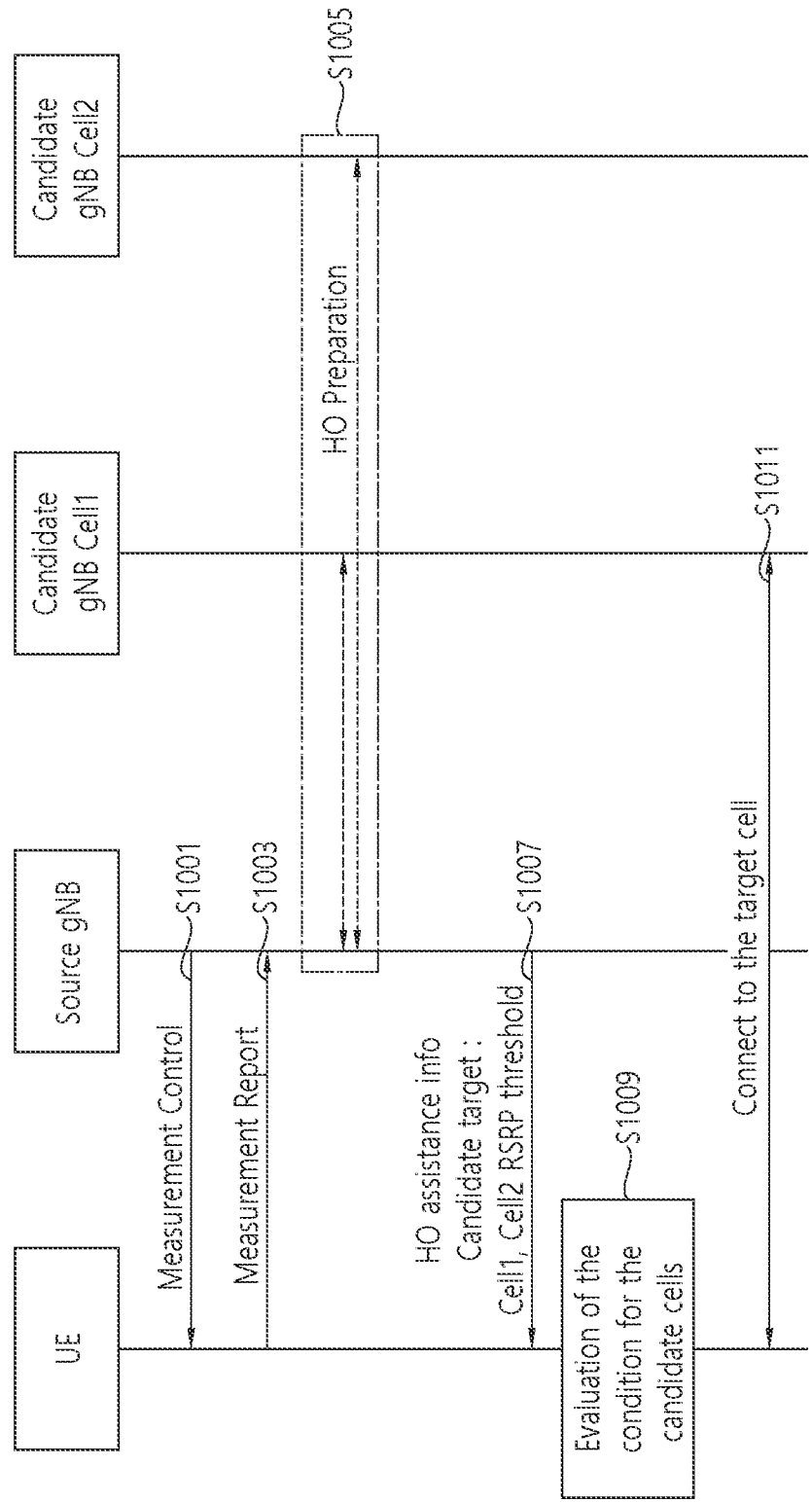
FIG. 10 shows an example of a conditional handover procedure to which technical features of the present disclosure can be applied.

As a way to resolve the above difficulties, it is suggested to consider handover procedure based on a configured condition (i.e., conditional handover procedure). The motivation for the conditional handover procedure is to reduce the time to taken for transmission of measurement report message, and a reception of handover command and handover preparation message so that it would be possible to reduce the handover failure caused by not receiving the handover command at a proper time. FIG. 10 shows an overall procedures of the conditional handover mechanism.

FIG. 10 shows an example of a conditional handover procedure to which technical features of the present disclosure can be applied. FIG. 10 shows an overall procedure of condition based autonomous handover procedure (i.e., conditional handover procedure).

Referring to FIG. 10, in step S1001, the source gNB may transmit measurement control message to the UE. The source gNB may configure the UE measurement procedures according to the roaming and access restriction information and, for example, the available multiple frequency band information through the measurement control message. Measurement control information provided by the source gNB through the measurement control message may assist the function controlling the UE's connection mobility.

In step S1003, the UE may transmit a measurement report message to the source gNB. The measurement report message may comprise a result of measurement on neighbor cell(s) around the UE which can be detected by the UE. The UE may generate the measurement report message according to a measurement configuration and/or measurement control information in the measurement control message received in step S1001.

In step S1005, the source gNB may perform handover preparation with the candidate gNB cell 1 and the candidate gNB cell 2. The source gNB might determine the set of candidate cells (i.e., the candidate gNB cell 1 and the candidate gNB cell 2) based on the measurement report received from the UE.

In step S1007, the source gNB may provide handover assistance information which includes set of candidate cells (e.g., the candidate gNB cell 1 and the candidate gNB cell 2) and handover conditions (e.g., RSRP thresholds) for a conditional handover. The handover condition can be configured for each candidate cell, or for the set of candidate cells. According to various embodiments, it would be possible for the network to prepare the candidate cells and provide the handover assistance information without the measurement report from the UE if the network is able to know the trajectory or location of the UE based on e.g. location reporting. The handover assistance information would comprise cell quality based conditions and a configuration which would be used in a target cell. Also, the handover assistance information would include configuration for one or more candidate cells. The handover assistance information may be referred to as conditional handover command.

In step S1009, the UE may perform an evaluation of the handover conditions for the candidate cells. If the UE receives handover assistance information, the UE would initiate to evaluate the handover conditions for the candidate cells in the list to determine whether to perform conditional handover to one of the candidate cells.

In step S1011, the UE may connect to the target cell. The UE may disconnect from the source gNB, and connect to the target cell (i.e., candidate gNB cell 1), if the handover condition for the candidate gNB cell 1 is met. The candidate gNB cell 1 may become a target cell for a conditional handover, and the UE would perform connecting to the prepared target cell.

According to various embodiments, the handover assistance information (or, the conditional handover command) may comprise handover validity timer. For example, if the handover validity timer expires, the network and/or the UE may discard a configuration associated with the conditional handover. In addition, based on a measurement report from the UE, the network would configuration, modify and/or discard the configuration associated with the conditional handover.

According to various embodiments, if the UE successfully connects to the target cell, the target cell could inform to the source cell to discard the reserved configuration of candidate cells other than the target cell.

According to various embodiments, technical features of the present disclosure can be applied to a conditional dual connectivity (DC) based handover procedure. An example of the conditional DC based handover procedure is described below.

The make-before-break (MBB) and RACH-less handover (HO) may be considered to reduce HO interruption. For example, MBB may retain a link of source cell during HO procedure. The source cell may transmit data to UE continuously until the handover is completed, so the interruption may be reduced. However, the channel quality of source cell may be getting worse quickly specially in high frequency and the stopping point of data transmission between source cell and UE may be not cleared, so the UE may not receive the data from the source cell or source cell may stop transmitting data early to UE when MBB is used. It can cause loss of data and HO interruption. In addition, the RACH-less HO may contain UL grant for HO complete message in mobility control information via RRC Connection Reconfiguration message. It can help to skip the RACH procedure and reduce the interruption. However, RACH-less HO may be only used for time aligned target cell that UE reuse the TA value. Moreover, in NR, the UL grant for target cell may be required to consider beam forming. The received UL grant for target cell would not be suitable when the actual HO is performed. Therefore, it is hard to achieve 0ms interruption with only applying MBB and RACH-less HO.

To achieve almost 0ms interruption handover, DC based handover may be considered. The sequence of 0ms interruption handover with single cell may be regarded as following steps (i.e., the DC based handover procedure may comprise the following steps):

Step 1) UE sends measurement report to the source gNB;
Step 2) UE receives reconfiguration for adding target cell as SCG PSCell;
Step 3) UE sends measurement report to the master gNB. This step may be optional.
Step 4) UE receives role change request via reconfiguration message. The source cell becomes secondary gNB and the target cell becomes master gNB
Step 5) UE may receive a message to release SgNB From the above sequence, role change may be performed after UE reported MR.

According to the timing of MR, several issues can be considered.

At the first, if UE reports the MR when serving cell is lower than target cell or a threshold, MgNB is likely to be dropped before the role change. Especially, high frequency and beam forming may be considered. The channel quality of high frequency cell may be attenuated quickly. When gNB of high frequency cell sends role change request message and receives role change acknowledge message, RLF would be already occurred. So, the target cell may need to be added earlier and role change should be performed quickly. However, sending role change request and receiving role change acknowledge message may be required for the role change.

On the other hand, if UE reports the MR when target cell is higher than a threshold, role change can be performed even the channel quality of PCell is better than PSCell. It may cause ping-pong and waste resources for signalling.

Moreover, there is no event which can compare the PCell and PSCell. So, if once the target cell is added as PSCell, it would be hard to compare the channel quality of source cell (i.e. PCell) and target cell (i.e. PSCell).

In legacy handover, UE may report measurement report (MR) and receive HO command when source cell decides to HO. However, in DC based handover, UE may receive SCG addition at first and UE receive role change request via the next RRC connection reconfiguration message. Likewise, the MgNB may send/receive SgNB addition/ACK to/from the target cell and MgNB may send/receive Role Change Request to/from SgNB. Therefore, the DC based handover can cause delayed handover due to multiple handshakes between the source gNB and target gNB.

The conditional handover may be considered to reduce the latency during the handover. If DC based handover is combined with conditional handover, the number of handshakes between the gNBs can be reduced and HOF could be reduced. For example, UE may report MR when the target cell is better than a threshold. The source cell may add the target cell as the SgNB and prepare the role change simultaneously when channel quality of the source cell is still in good condition. After that UE may receive role change trigger condition (e.g. PSCell is better than PCell) and trigger the role change when it is satisfied. The gNBs can change the role immediately because gNBs prepared the role change in advanced. It could reduce the role change latency and handover/role change failure could be reduced.

As described above, in a wireless communication system (e.g., NR), one of the possible enhanced handover mechanisms is autonomous condition based handover (i.e., conditional handover). The network may provide a list of candidate cells, one or more handover conditions for the candidate cells, and/or the radio resource configuration information for the candidate cells through a conditional handover command to the UE, and the UE may evaluate the given handover conditions. If one of the handover condition is satisfied, the UE may try to connect to a target cell for which the handover condition is satisfied. If the UE successfully connects to the target cell, the UE may apply the configuration of the target cell. However, in this mobility procedure, a UE behaviour and/or a network behaviour in a case that the UE declares the failure of the conditional handover for the selected target cell after expiry of handover validity timer has not been discussed yet.

According to an embodiment of the present disclosure, a method for performing a mobility by a UE in a wireless communication system comprises: receiving information from a serving cell about candidate cells for mobility, mobility condition and reporting condition; performing measurement to decide a target cell among the candidate cells, based on the mobility condition; detecting one or more candidate cells which are satisfied with the reporting condition when the mobility is terminated without completion to access to the target cell; and reporting information to the serving cell for the detected candidate cells as a result of the mobility.

The embodiments of the present disclosure can be applied to conditional mobility, in which one or more candidate cells are determined based on a condition first, and actual mobility is performed towards one of the candidate cells. The conditional mobility may comprise at least one of conditional handover, conditional dual connectivity (DC) based handover, or conditional secondary cell group (SCG) change.

Figure 11:
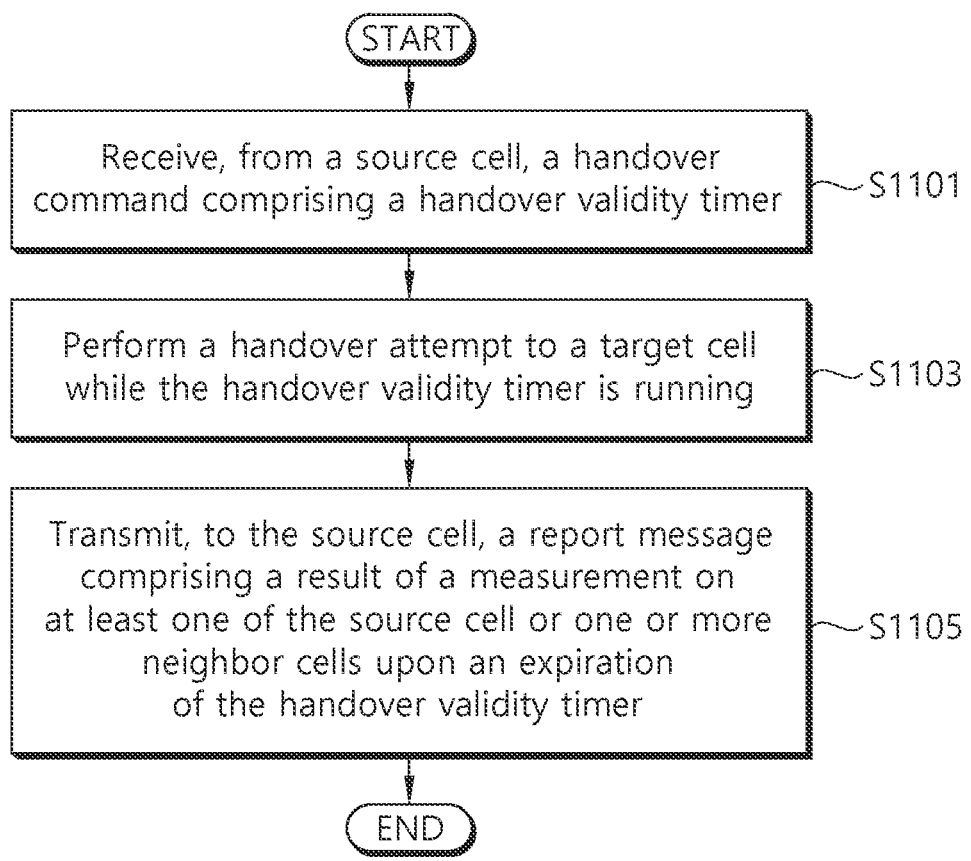
FIG. 11 shows an example of a method for mobility management according to an embodiment of the present disclosure.

FIG. 11 shows an example of a method for mobility management according to an embodiment of the present disclosure. The method may be performed by a wireless device (e.g., UE).

Referring to FIG. 11, in step S1101, the wireless device may receive, from a source cell, a handover command comprising a handover validity timer. The handover command may be received through a RRC dedicated signalling, broadcast information such as system information, and/or a RRC reconfiguration message. The handover command may be network controlled handover command or conditional handover command—however, the handover command is not limited to these types of handover commands.

In step S1103, the wireless device may perform a handover attempt to a target cell while the handover validity timer is running. The wireless device may start the handover validity timer in response to receiving the handover command, or when determining the target cell.

In step S1105, the wireless device may transmit, to the source cell, a report message comprising cell information including target cell information for the target cell upon an expiration of the handover validity timer. The cell information may further comprise neighbor cell information for one or more neighbor cells other than the target cell. The one or more neighbor cells may be candidate cell(s) for a conditional handover, or neighbor cell(s) around the wireless device which the wireless device can measure. The one or more neighbor cells may or may not comprise the target cell. Therefore, the report message may also comprise a result of a measurement on the target cell. The result of a measurement may comprise a signal quality/strength (e.g., reference signal received power (RSRP), reference signal received quality (RSRQ)) for each cell. For example, the wireless device may receive a signal/reference signal from a cell, and measure a signal quality of the reference signal to obtain a signal quality for the cell. The expiration of the handover validity timer may result in a failure of the handover attempt.

According to various embodiments, the wireless device may perform a measurement on one or more neighbor cells other than the target cell during the handover attempt to the target cell. That is, the wireless device may perform a measurement on one or more neighbor cells other than the target cell while the handover validity timer is running. Then, the wireless device may obtain a result of the measurement on the one or more neighbor cells.

According to various embodiments, the target cell information for the target cell may comprise at least one of a cell ID of the target cell, or a result of a measurement on the target cell. The neighbor cell information for the one or more neighbor cells may comprise at least one of a cell ID of the one or more neighbor cells, a result of a measurement on the one or more neighbor cells, an event entering status of the one or more neighbor cells, an event leaving status of the one or more neighbor cells, or a TTT counting status of the one or more neighbor cells. The neighbor cell information can also be referred to as candidate cell information if the one or more neighbor cells are candidate cell(s) for conditional handover.

According to various embodiments, after transmitting the response message to the source cell, the wireless device may receive, from the source cell, a handover command comprising another target cell among the one or more neighbor cells, and perform a handover attempt to the other target cell. The handover command may be a conditional handover command or a network controlled handover. The handover command may comprise a handover validity timer, and the wireless device may start the handover validity timer to run in response to receiving the handover command, and perform a handover attempt to the other target cell while the handover validity timer is running. The other target cell may be determined among the one or more neighbor cells based on neighbor cell information for the one or more neighbor cells.

According to various embodiments, the handover command may be a conditional handover command. The conditional handover command may comprise at least one of a list of candidate cells, or one or more handover conditions for the candidate cells. The candidate cells can be selected from neighbor cells around the wireless device which the wireless device can detect and/or measure. The handover condition can be configured for each candidate cell, or a group of candidate cells. The group of candidate cells may be part of or all of the candidate cells in the list.

According to various embodiments, the wireless device may perform a measurement on the candidate cells, identify the target cell for which a handover condition is satisfied among the candidate cells based on a result of a measurement on the candidate cells, and perform a measurement on at least one candidate cell other than the target cell among the candidate cells during the handover attempt to the target cell. That is, the wireless device may perform a measurement on the at least one candidate cell while the handover validity timer is running.

According to various embodiments, the conditional handover command may comprise a report instruction, and the report message may comprise candidate cell information for all of the at least one candidate cell based on the report instruction. That is, if the conditional handover command comprises a report instruction, the wireless device which received the conditional handover command may identify the report instruction in the conditional handover command, generate the report message comprising candidate cell information for all of the at least one candidate cell (e.g., cell ID of the all of the at least one candidate cell, a result of a measurement on the all of the at least one candidate cell, an event entering status of all of the at least one candidate cell, an event leaving status of all of the at least one candidate cell, and/or a TTT counting status of all of the at least one candidate cell) according to the report instruction, and transmit the report message to the source cell. The report message may also comprise target cell information for the target cell.

According to various embodiments, the conditional handover command may comprise one or more reporting conditions for the candidate cells. The reporting condition can be configured for each candidate cell, or a group of candidate cells. The group of candidate cells may be part of or all of the candidate cells in the list. The wireless device may identify a candidate cell—a reporting condition for the candidate cell is satisfied—based on a result of the measurement on the at least one candidate cell. The report message may comprise candidate cell information for the candidate cell, and the report message may exclude candidate cell information for other candidate cells—reporting condition for the other candidate cells is not satisfied—among the at least one candidate cell.

According to various embodiments, the one or more reporting conditions for the candidate cells may comprise one or more handover events for the candidate cells. The wireless device may identify the candidate cell—an entering condition for a handover event for the candidate cell is satisfied—among the at least one candidate cell.

According to various embodiments, the one or more reporting conditions for the candidate cells may comprise one or more TTT thresholds for the candidate cells. The wireless device may determine a time period during which an entering condition for a handover event is satisfied for each of the at least one candidate cell, and identify the candidate cell—the time period for the candidate cell is greater than or equal to a TTT threshold—among the at least one candidate cell. The handover event may be included in a handover condition or a reporting condition.

According to various embodiments, the one or more reporting conditions for the candidate cells may comprise one or more offsets for the candidate cells. The wireless device may identify the candidate cell—a signal quality for the candidate cell is better than that for the source cell by more than or equal to an offset—among the at least one candidate cell.

According to various embodiments, the one or more reporting conditions for the candidate cells may comprise one or more thresholds for the candidate cells. The wireless device may identify the candidate cell—a signal quality for the candidate cell is better than a threshold—among the at least one candidate cell.

Figure 12:
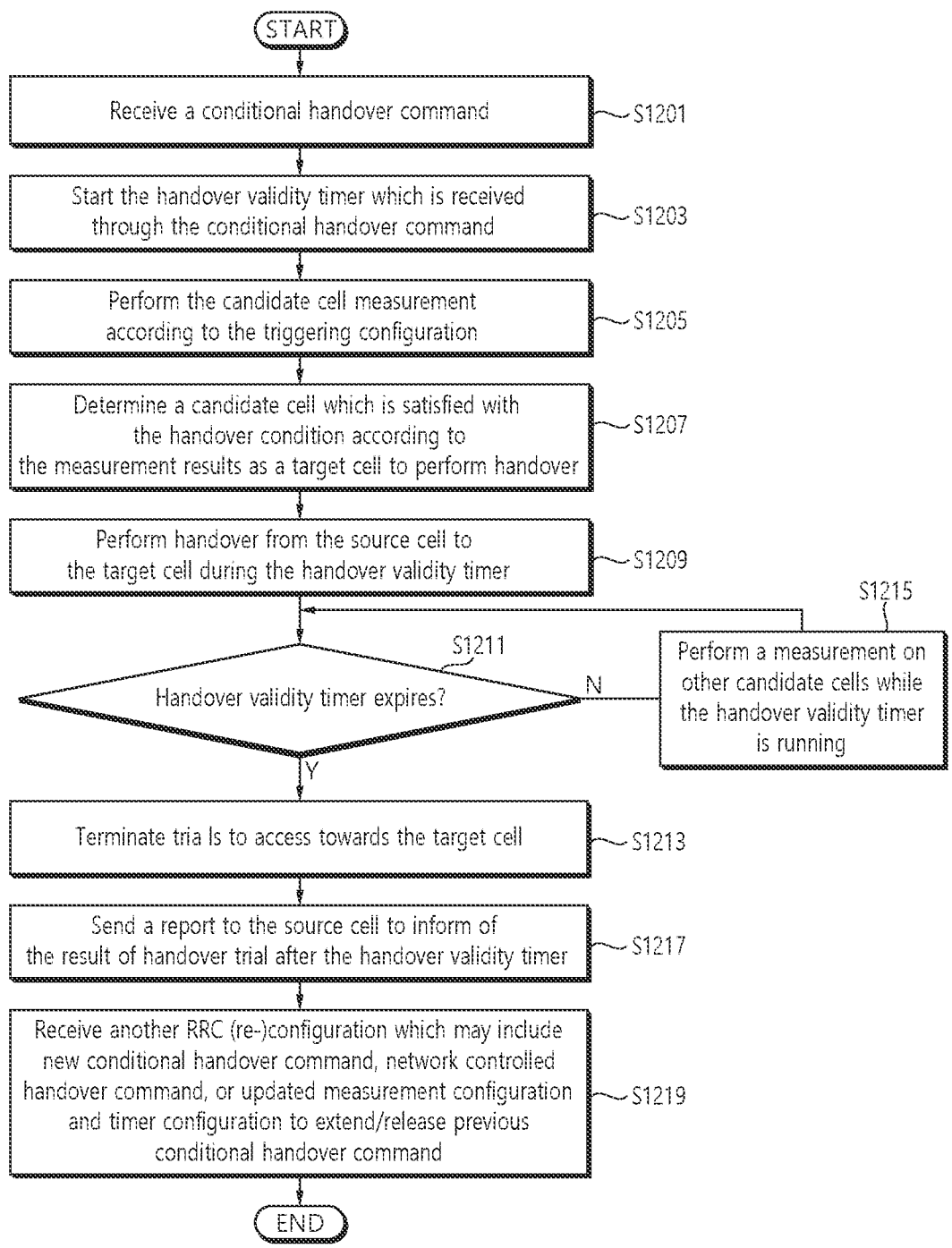
FIG. 12 shows an example of a method for performing a mobility according to an embodiment of the present disclosure.

FIG. 12 shows an example of a method for performing a mobility according to an embodiment of the present disclosure. The method may be performed by a wireless device (e.g., UE). The method illustrated in FIG. 12 is based on a conditional handover exemplarily, but the present disclosure is not limited thereto.

Referring to FIG. 12, when a wireless device is in RRC_CONNECTED state on a source cell, in step S1201, the wireless device may receive a conditional handover command. The conditional handover command can be provided by RRC dedicated signalling or broadcast information such as system information. The conditional handover command may include at least one of a list of one or more candidate cells. Furthermore, the conditional handover command may include one or more following information to perform the conditional handover:

Handover validity timer(s): The handover validity timer may be configured per each candidate cell or per group of the candidate cells. One example of the handover validity timer may be T304. The handover validity timer may be used to indicate a valid duration to perform a procedure of conditional handover. After the handover validity timer is expired, the conditional handover command is no longer valid so that the network may release the resources for handover preparation.

Handover condition(s)(e.g., event based condition such as measurement event A2 or A3): The handover condition may be configured per each candidate cell or per group of the candidate cells. The handover condition may be used to determine which candidate cell is suitable to move to from the source cell. When the handover condition for a candidate cell is satisfied, the wireless device may determine that the candidate cell is suitable for target cell for handover.

Handover reporting condition(s) (e.g. threshold, offset, event entering status and/or number of time to trigger): The handover reporting condition may be used to help the wireless device report information on candidate cells when the handover validity timer expires. When the handover reporting condition is satisfied while the handover validity timer is running, the wireless device may provide to the source cell information informing which candidate cells has more potential to perform handover to after expiry of the handover validity timer. The information on candidate cells may be used to help network's decision on which candidate cells have possibility to perform handover to at near future even though current handover trial isn't succeed (i.e., the handover validity timer expires). Alternatively, instead of providing any handover reporting condition to receive the handover report/report message, the network may just provide an indication (i.e., report instruction) to get the handover report. Then, the wireless device may be able to report all candidate cell's status when the handover validity timer expires. The handover reporting condition may be simply referred to as reporting condition.

In step S1203, the wireless device may start the handover validity timer which is received via the conditional handover command. The wireless device may start the handover validity timer right after receiving the conditional handover command or when determining a target cell among the candidate cells in the list.

In step S1205, the wireless device may perform a candidate cell measurement according to a triggering configuration i.e. handover condition for each candidate cell In step S1207, the wireless device may determine a candidate cell which for which a handover condition is satisfied according to measurement results, as a target cell to perform handover.

In step S1209, the wireless device may perform a handover from the source cell to the target cell while the handover validity timer is running. That is, the wireless device may perform a handover attempt from the source cell to the target cell while the handover validity timer is running.

In step S1211, the wireless device may determine whether the handover validity timer expires. If the handover validity timer expires and the wireless device do not make it to access to the target cell, in step S1213, the wireless device may terminate trials to access towards the target cell. Otherwise, in step S1215, the wireless device may perform a measurement on other candidate cells (i.e., candidate cells other than the target cell) while the handover validity timer is running.

In step S1217, the wireless device may transmit, to the source cell, a report message/handover report to inform of the result of the handover trial after the handover validity timer expired. The wireless device may check the availability to report using the handover reporting condition(s) e.g. whether there are any candidate cell which satisfies the handover reporting condition. If the network provides a report instruction to report the result of handover trial instead of the reporting condition, the wireless device may report all candidate cell's status and/or measurement results without considering the handover reporting condition. The wireless device may set the information for the result of handover trial according to what the handover reporting condition is as follows:

Threshold based reporting condition (i.e., the handover reporting condition comprises a threshold): The threshold may be related to a signal quality of a cell and used to decide one or more cells to report to the source cell after expiry of the handover validity timer. If the network provide one or more thresholds for candidate cells as the handover reporting condition, the wireless device may compare signal quality of each candidate cell with this threshold while the handover validity timer is running. If there is any cell which has better signal quality than the threshold, the wireless device may regard the cells to be reported for the result of handover trial.

Offset based reporting condition (i.e., the handover reporting condition comprises an offset): The offset may be an integer value and used to decide one or more cells to report to the source cell after expiry of the handover validity timer. If the network provides one or more offsets for candidate cells as the handover reporting condition, the wireless device may determine whether the signal quality for each candidate cell satisfies the handover reporting condition using this offset while the handover validity timer is running. If there is any cell whose signal quality is offset better than that of the source cell and/or target cell, the wireless device may regard the cell(s) to be reported for the result of handover trial.

Event based handover condition (i.e., handover reporting condition comprises an occurrence condition for a handover event): If the network set the handover reporting condition as event based reporting condition, the wireless device may check the each status of the handover reporting condition for each candidate cell using the occurrence condition for the handover event. If there is any cell which satisfies the occurrence condition for the handover event after decision of the target cell while the handover validity timer is running, the wireless device may regard the cells to be reported for the result of handover trial.

TTT based reporting condition (i.e., handover reporting condition comprises TTT threshold): The TTT is an integer value and may be used to decide one or more cells to report to the source cell after expiry of the handover validity timer. If the network provides one or more TTT thresholds/values for candidate cells as the handover reporting condition, the wireless device may check the number of TTT for each candidate cell while the handover validity timer is running. If there is any cell which has the same or more the number of TTT for the handover condition compared to the number of TTT for the handover reporting condition, the UE may regard the cells to be reported for the result of handover trial.

The wireless device may include one or more of the following information for the result of handover trial in the report message while the handover validity timer is running:

1) To indicate which candidate cells has potential to perform next mobility procedure,
   (physical/global) cell identities/identifiers (IDs) of candidate cells;
   Measurement results (e.g., RSRP/RSRQ) of candidate cells;
   Reporting status to trigger measurement event for candidate cells (TTT status, Event entering status, Event leaving status);
2) To indicate which candidate cells was a target cell and failed the handover,
   (physical/global) cell ID of the target cell; or
   Measurement result (e.g., RSRP/RSRQ) of the target cell In step S1219, the wireless device may receive another RRC (re-)configuration which may include new conditional handover command, network controlled handover command (e.g., legacy handover command), or just updated measurement configuration and timer configuration to extend/release previous conditional handover command.

Figure 13:
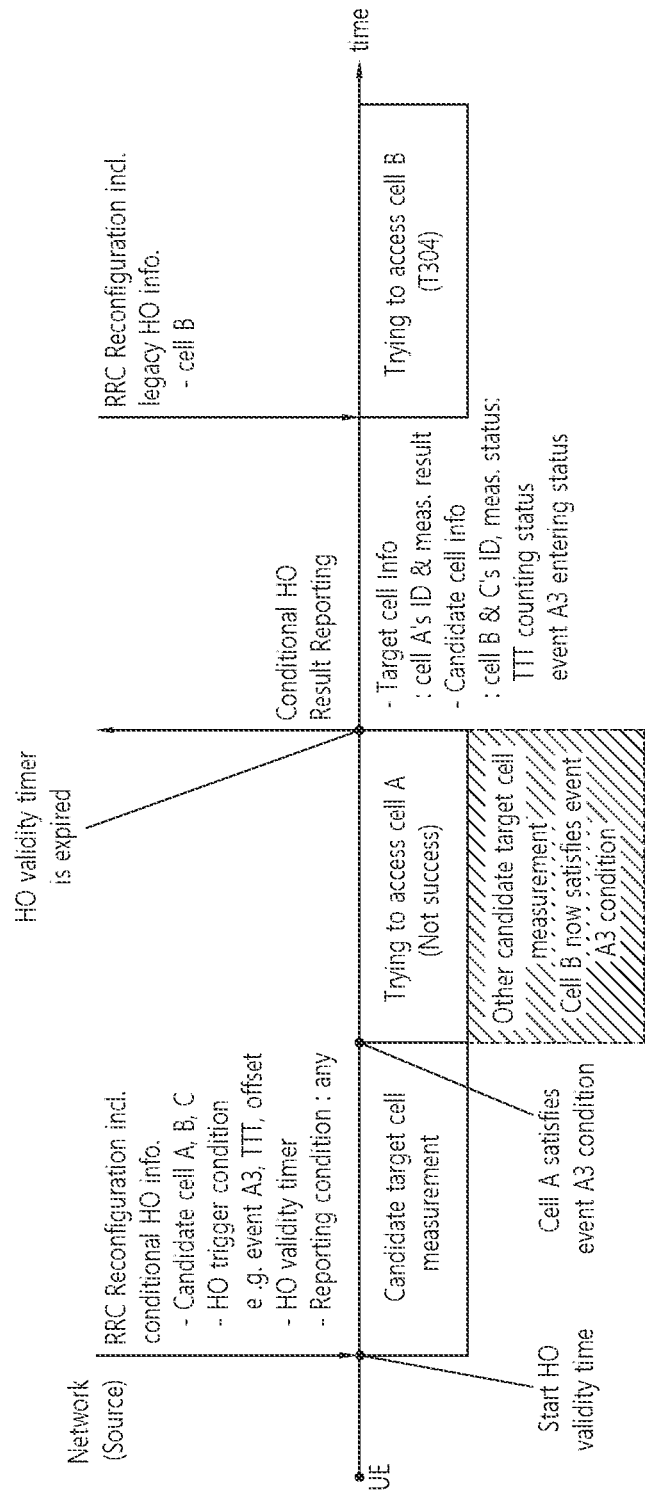
FIG. 13 shows an example of measurement and/or status reporting in a case the report instruction is configured according to an embodiment of the present disclosure.

FIG. 13 shows an example of measurement and/or status reporting in a case the report instruction is configured according to an embodiment of the present disclosure.

Referring to FIG. 13, the UE is connected to a network and/or a source cell (or, source gNB, eNB, base station). The source cell may decide that the UE needs to perform handover because a signal quality of the source cell is getting lower. The source cell may request to one and more neighbor cells to prepare handover for the UE. After handover preparation with the several neighbor cells, the source cell may provide conditional handover command to the UE.

The UE may receive a RRC signalling message to perform conditional handover i.e. RRC reconfiguration message including conditional handover command. The conditional handover command may include information on one or more candidate cells as a list e.g. cell A, cell B and cell C, each candidate cell's handover condition(s), and handover validity timer. Also, the conditional handover command may include a report instruction instructing the UE to report measurement result and/or status of all candidate cells. Each candidate cell's handover condition may be similar to a condition of measurement report in a network controlled handover e.g. a handover condition for event A5 which means that the UE autonomously performs handover without reporting measurement result to the source cell and without receiving any additional handover command from the source cell when one of candidate cell's handover condition is satisfied e.g. source cell's signal quality becomes lower than a first threshold and signal quality for one of candidate cells becomes better than a second threshold. For another example, each candidate cell's handover condition may comprise handover condition for event A3 which means that the UE autonomously performs handover without reporting measurement result to the source cell and without receiving any additional handover command from the source cell when one of candidate cell's handover condition is satisfied e.g., a signal quality for one of candidate cells becomes offset better than that for the source cell. Each candidate cell's handover condition can be configured per cell or per conditional handover command.

Upon receiving the conditional handover command, the UE may start the handover validity timer to run and perform measurement for the candidate cells. For example, the cell A may have a handover condition for event A5 with TTT, cell offsets, hysteresis value, and the handover condition for even A5 may be satisfied when a signal quality for a source cell becomes lower than a threshold and a signal quality for the cell A becomes better than another threshold. For another example, the cell A may have a handover condition for event A3 with TTT, cell offsets, hysteresis value, and the handover condition for event A3 may be satisfied when a signal quality for the cell A is offset better than that for the source cell. Then, the UE may identify that the cell A satisfies a handover condition for the cell A which means that an entering condition for the event A3 is satisfied for the cell A during the TTT defined for the event A3. The UE may decide the cell A as a target cell to perform handover.

During trying to access to the cell A from the source cell, the UE keeps measuring other candidate cell's signal quality if possible while the handover validity timer is running. The cell B satisfies a handover condition for event A3 to trigger handover but the UE doesn't perform any action related to the cell B while the handover validity timer is running.

Upon expiry of the handover validity timer, the UE may stop trying to perform handover because the UE didn't success to the cell A. Because the source cell indicates the UE to report the result of handover trial (i.e., measurement result and/or status) but does not indicate the handover reporting condition, the UE may send a RRC signalling message including the results of the conditional handover for all candidate cells i.e. the cell A's physical/global cell identity and RSRP/RSRQ, and the cell B and cell C's physical/global cell identity, RSRQ/RSRQ, event A3 entering status (YES), event A3 leaving status, and TTT counting status.

The RRC signalling message including the results of the conditional handover can be MeasurementReport, RRCReconfigurationComplete, or a new message. The RRC signalling message including the results of the conditional handover may include target (physical/global) cell identity and target cell's latest measurement results e.g. RSRP/RSRQ and other candidate cell's measurement results. For the other candidate cell's measurement results, the UE may report other candidate cell's latest signal qualities e.g. RSRP/RSRQ, and handover condition status such as time-to-trigger counting status, event entering status for the handover condition. If there is any candidate cell which satisfies an entering condition for a handover event to trigger handover during trying to access the target cell, the event entering status may be set to 'entered', for example. Further, the UE may report TTT counting status for indicating how soon the one of candidate cells would satisfies the handover condition e.g. timer-to-trigger value: ¾.

Upon receiving the RRC signalling message including the results of the conditional handover, the source cell may consider to maintain the previous conditional handover command. For this case, the source cell may know that the cell A and C aren't suitable for the UE and the cell B is now satisfying the handover condition to perform handover. The source cell may release handover preparation with the cell A and the cell C, and provide new RRC reconfiguration signalling message including a network controlled handover command of the cell B.

The UE may receive a new RRC signalling message to identify a network controlled handover command and the UE may perform the network controlled handover procedure from the source cell to the cell B.

Figure 14:
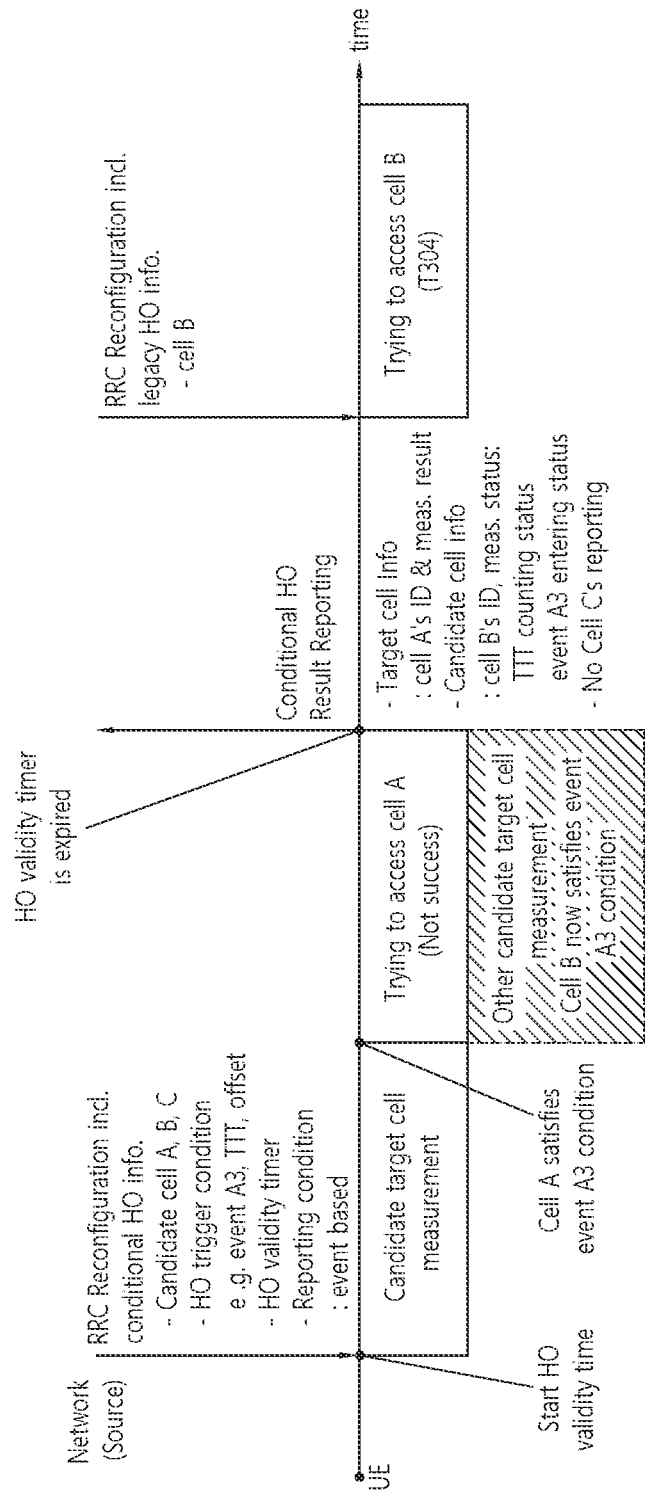
FIG. 14 shows an example of measurement and/or status reporting in a case event based reporting condition is configured according to an embodiment of the present disclosure.

FIG. 14 shows an example of measurement and/or status reporting in a case event based reporting condition is configured according to an embodiment of the present disclosure.

Compared to FIG. 13, in an embodiment illustrated in FIG. 14, the conditional handover command may comprise reporting condition set to event based reporting condition instead of a report instruction. In this case, the reporting condition may comprise an occurrence condition for a handover event e.g., event A3.

The UE may perform a measurement on candidate cells other than the target cell (e.g., cell B and C) while the handover validity timer is running, and identify a candidate cell (e.g., cell B) which satisfies the occurrence condition for the event A3 based on a result of the measurement on the candidate cells. The UE may also identify that cell C does not satisfy the occurrence condition for the event A3. Therefore, the UE may determine that a reporting condition for the cell B is satisfied while the reporting condition for the cell B is not satisfied.

Then, the UE may transmit, to the source cell, a report message comprising target cell information for the target cell (e.g., cell A) and candidate cell information for the candidate cell (e.g., cell B) which satisfied the reporting condition. The target cell information for the cell A may comprise the cell A's physical/global cell identity and/or RSRP/RSRQ, and the candidate cell information for the cell B may comprise the cell B's physical/global cell identity, RSRQ/RSRQ, event A3 entering status, event A3 leaving status, and/or TTT counting status. Note that in this case the report message excludes candidate cell information for the candidate cell C, since the candidate cell C does not satisfy the reporting condition.

Figure 15:
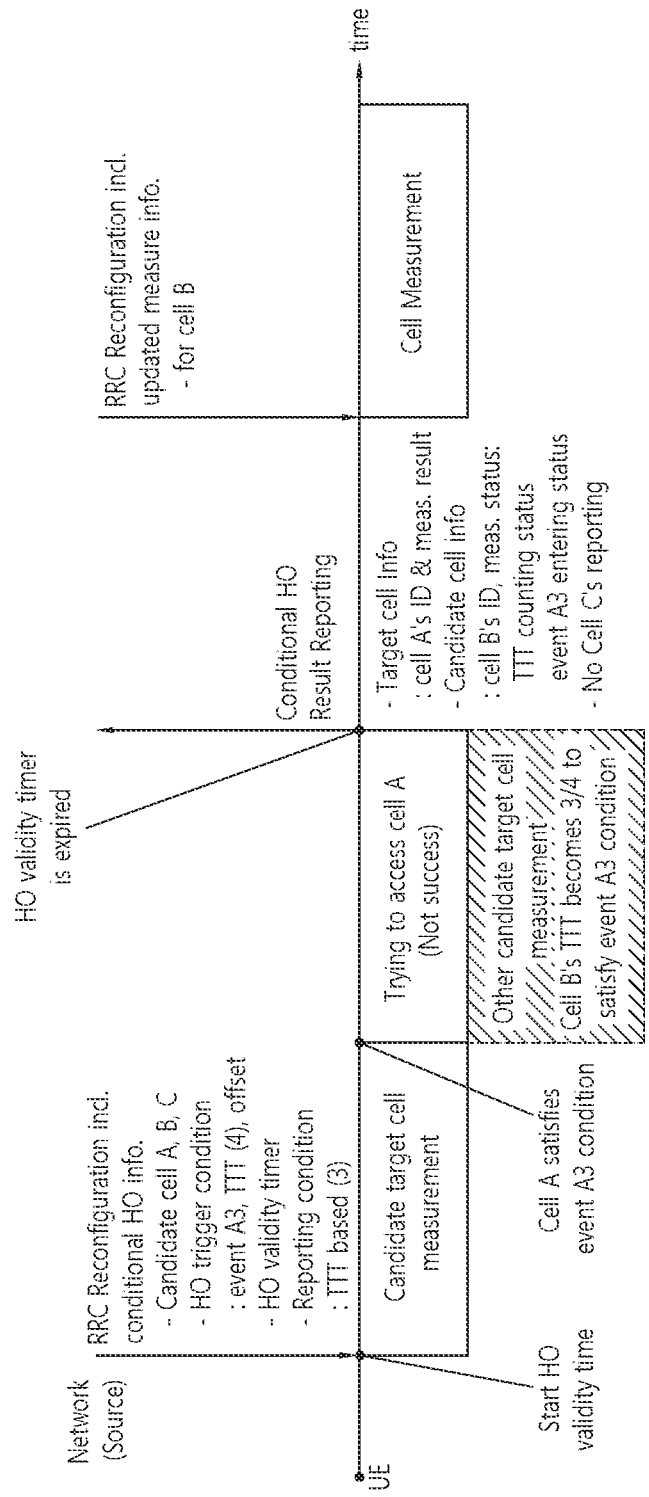
FIG. 15 shows an example of measurement and/or status reporting in a case TTT based reporting condition is configured according to an embodiment of the present disclosure.

FIG. 15 shows an example of measurement and/or status reporting in a case TTT based reporting condition is configured according to an embodiment of the present disclosure.

Compared to FIG. 13, in an embodiment illustrated in FIG. 15, the conditional handover command may comprise reporting condition set to TTT based reporting condition instead of a report instruction. In this case, the reporting condition may comprise a TTT threshold for a handover event e.g., event A3.

The UE may perform a measurement on candidate cells other than the target cell (e.g., cell B and C) while the handover validity timer is running, and determine a time period during which an entering condition for the event A3 is satisfied for each of the cell B and the cell C based on a result of a measurement on the candidate cells B and C. The UE may identify a candidate cell (e.g., cell B) for which the time period is greater than or equal to the TTT threshold, and also identify that the time period for the cell C is less than the TTT threshold. Therefore, the UE may determine that a reporting condition for the cell B is satisfied while the reporting condition for the cell B is not satisfied.

Then, the UE may transmit, to the source cell, a report message comprising target cell information for the target cell (e.g., cell A) and candidate cell information for the candidate cell (e.g., cell B) which satisfied the reporting condition. The target cell information for the cell A may comprise the cell A's physical/global cell identity and/or RSRP/RSRQ, and the candidate cell information for the cell B may comprise the cell B's physical/global cell identity, RSRQ/RSRQ, event A3 entering status, event A3 leaving status, and/or TTT counting status. Note that in this case the report message excludes candidate cell information for the candidate cell C, since the candidate cell C does not satisfy the reporting condition.

Figure 16:
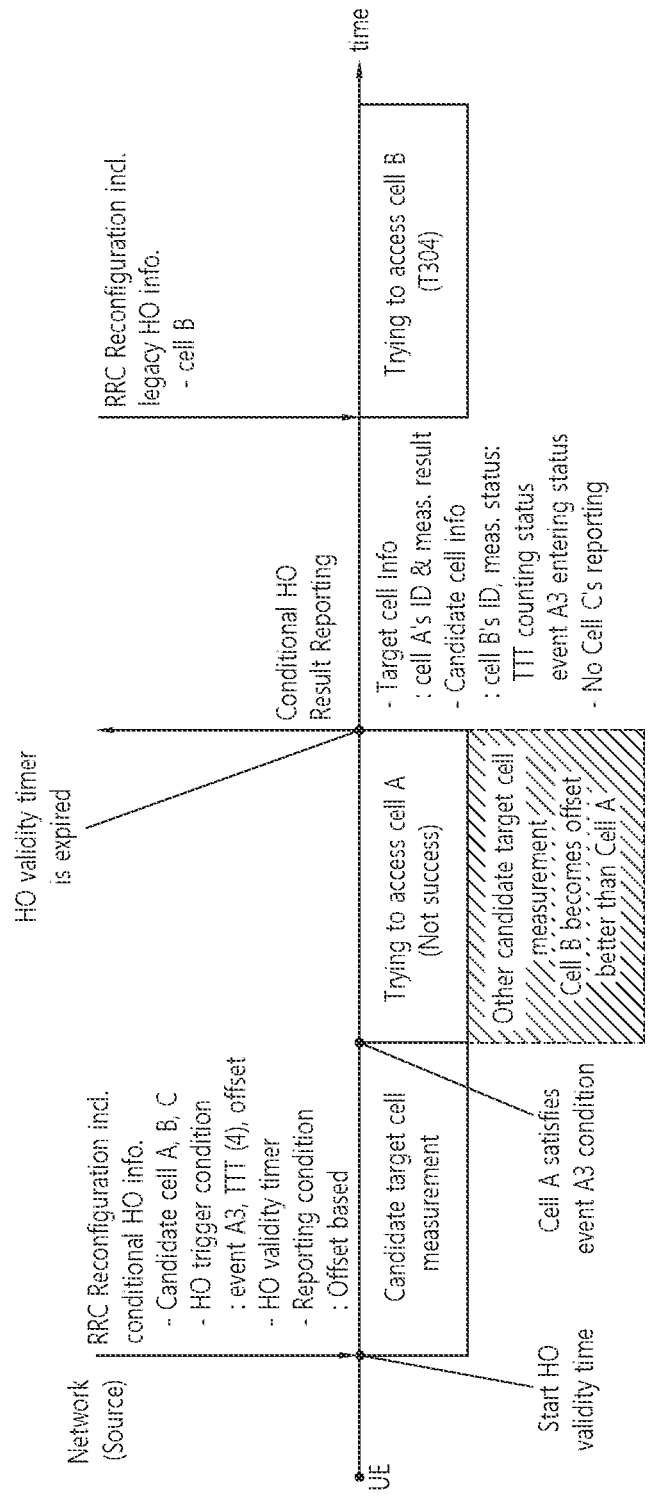
FIG. 16 shows an example of measurement and/or status reporting in a case offset based reporting condition is configured according to an embodiment of the present disclosure.

FIG. 16 shows an example of measurement and/or status reporting in a case offset based reporting condition is configured according to an embodiment of the present disclosure.

Compared to FIG. 13, in an embodiment illustrated in FIG. 16, the conditional handover command may comprise reporting condition set to offset based reporting condition instead of a report instruction. In this case, the reporting condition may comprise an offset.

The UE may perform a measurement on candidate cells other than the target cell (e.g., cell B and C) while the handover validity timer is running, and identify a candidate cell (e.g., cell B) for which signal quality is better than that for the source cell by more than or equal to the offset based on a result of the measurement on the candidate cells B and C. The UE may also identify that a signal quality for the cell C is not better than that for the source cell by more than or equal to the offset. Therefore, the UE may determine that a reporting condition for the cell B is satisfied while the reporting condition for the cell B is not satisfied.

Then, the UE may transmit, to the source cell, a report message comprising target cell information for the target cell (e.g., cell A) and candidate cell information for the candidate cell (e.g., cell B) which satisfied the reporting condition. The target cell information for the cell A may comprise the cell A's physical/global cell identity and/or RSRP/RSRQ, and the candidate cell information for the cell B may comprise the cell B's physical/global cell identity, RSRQ/RSRQ, event A3 entering status, event A3 leaving status, and/or TTT counting status. Note that in this case the report message excludes candidate cell information for the candidate cell C, since the candidate cell C does not satisfy the reporting condition.

According to various embodiments, because the UE can report the result of the received handover command right after the expiry, the network can figure out the specific status of UE to perform mobility. Without additional measurement configuration, the network recognizes which candidate cells still have potential to perform mobility so that the network can make better decision to provide next RRC (re-)configuration. This will be more efficient solution to handle the network resource to provide mobility.

Figure 17:
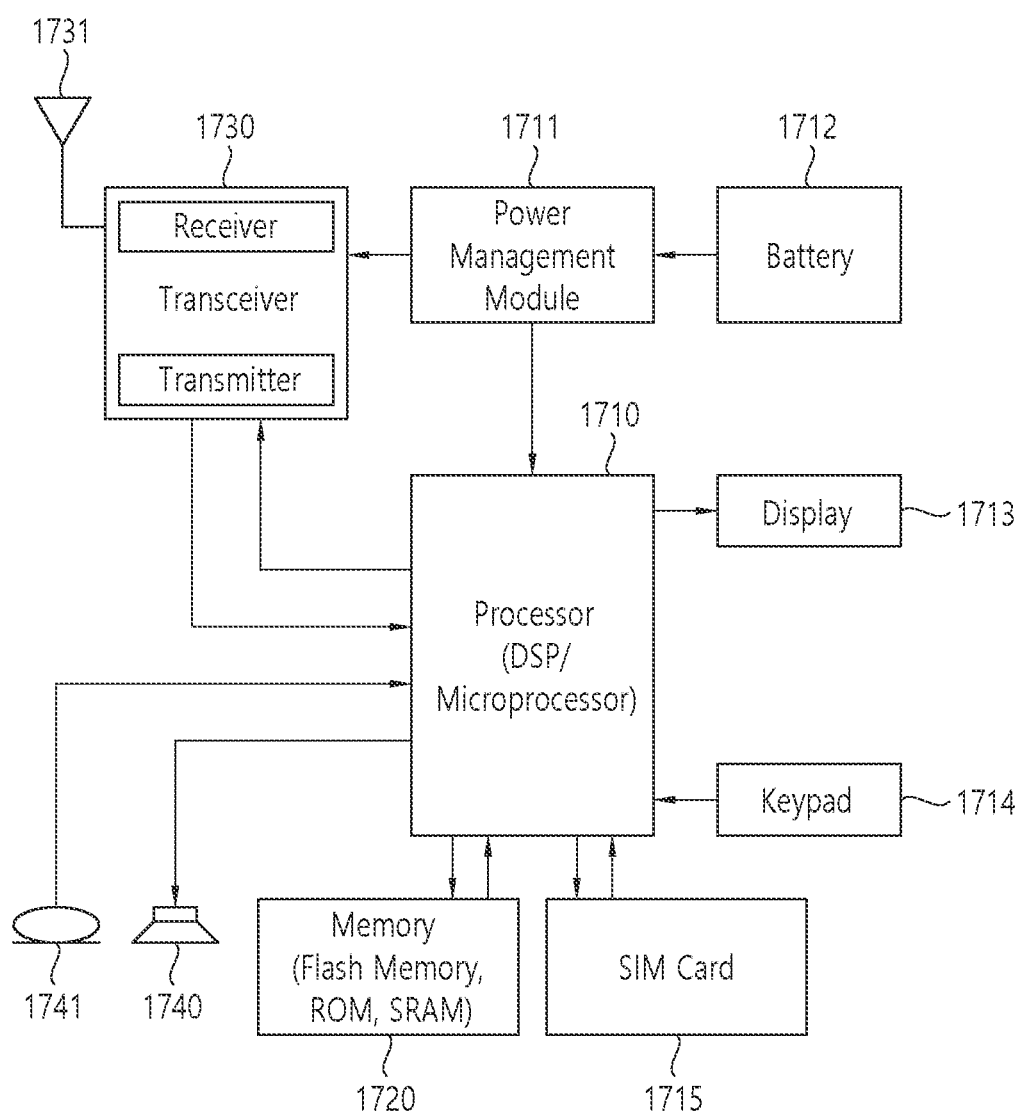
FIG. 17 shows a UE to implement an embodiment of the present disclosure.

FIG. 17 shows a UE to implement an embodiment of the present disclosure. The present disclosure described above for UE side may be applied to this embodiment.

A UE includes a processor 1710, a power management module 1711, a battery 1712, a display 1713, a keypad 1714, a subscriber identification module (SIM) card 1715, a memory 1720, a transceiver 1730, one or more antennas 1731, a speaker 1740, and a microphone 1741.

The processor 1710 may be configured to implement proposed functions, procedures and/or methods described in this description. Layers of the radio interface protocol may be implemented in the processor 1710. The processor 1710 may include application-specific integrated circuit (ASIC), other chipset, logic circuit and/or data processing device. The processor 1710 may be an application processor (AP). The processor 1710 may include at least one of a digital signal processor (DSP), a central processing unit (CPU), a graphics processing unit (GPU), a modem (modulator and demodulator). An example of the processor 1710 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to various embodiments, the processor 1710 may be configured to, or configured to control the transceiver 1730 to implement steps performed by wireless device and/or UE throughout the disclosure.

The power management module 1711 manages power for the processor 1710 and/or the transceiver 1730. The battery 1712 supplies power to the power management module 1711. The display 1713 outputs results processed by the processor 1710. The keypad 1714 receives inputs to be used by the processor 1710. The keypad 1714 may be shown on the display 1713. The SIM card 1715 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1720 is operatively coupled with the processor 1710 and stores a variety of information to operate the processor 1710. The memory 1720 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1720 and executed by the processor 1710. The memory 1720 can be implemented within the processor 1710 or external to the processor 1710 in which case those can be communicatively coupled to the processor 1710 via various means as is known in the art.

The transceiver 1730 is operatively coupled with the processor 1710, and transmits and/or receives a radio signal. The transceiver 1730 includes a transmitter and a receiver. The transceiver 1730 may include baseband circuitry to process radio frequency signals. The transceiver 1730 controls the one or more antennas 1731 to transmit and/or receive a radio signal.

The speaker 1740 outputs sound-related results processed by the processor 1710. The microphone 1741 receives sound-related inputs to be used by the processor 1710.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 18:
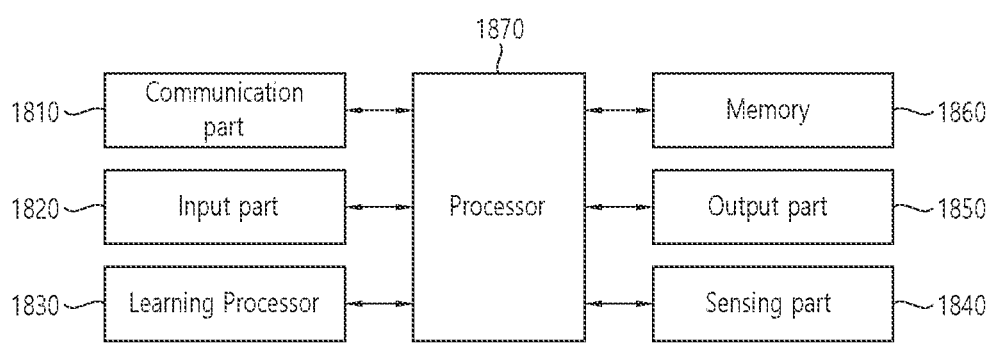
FIG. 18 shows an example of an AI device to which the technical features of the present disclosure can be applied.

FIG. 18 shows an example of an AI device to which the technical features of the present disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
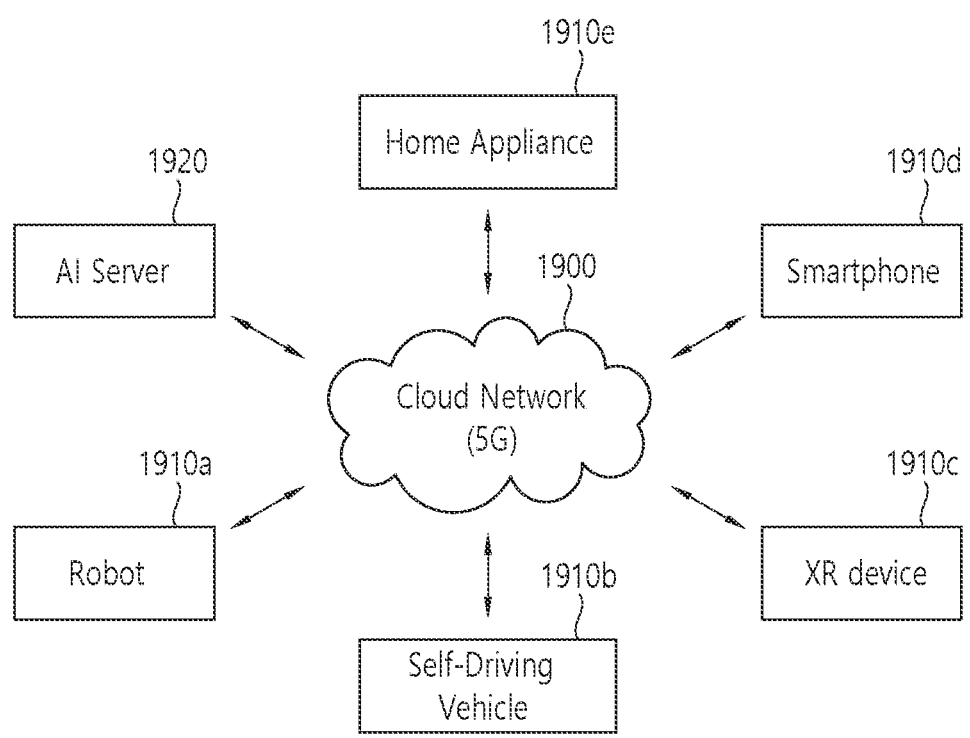
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1220, a robot 1910a, an autonomous vehicle 1910b, an XR device 1910c, a smartphone 1910d and/or a home appliance 1910e is connected to a cloud network 1900. The robot 1910a, the autonomous vehicle 1910b, the XR device 1910c, the smartphone 1910d, and/or the home appliance 1910e to which the AI technology is applied may be referred to as AI devices 1910a to 1910e.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910a to 1910e and 1220 consisting the AI system may be connected to each other through the cloud network 1900. In particular, each of the devices 1910a to 1910e and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1910a, the autonomous vehicle 1910b, the XR device 1910c, the smartphone 1910d and/or the home appliance 1910e through the cloud network 1900, and may assist at least some AI processing of the connected AI devices 1910a to 1910e. The AI server 1220 can learn the ANN according to the machine learning algorithm on behalf of the AI devices 1910a to 1910e, and can directly store the learning models and/or transmit them to the AI devices 1910a to 1910e. The AI server 1220 may receive the input data from the AI devices 1910a to 1910e, infer the result value with respect to the received input data using the learning model, generate a response and/or a control command based on the inferred result value, and transmit the generated data to the AI devices 1910a to 1910e. Alternatively, the AI devices 1910a to 1910e may directly infer a result value for the input data using a learning model, and generate a response and/or a control command based on the inferred result value.

Various embodiments of the AI devices 1910a to 1910e to which the technical features of the present disclosure can be applied will be described. The AI devices 1910a to 1910e shown in FIG. 19 can be seen as specific embodiments of the AI device 1800 shown in FIG. 18.

The present disclosure can have various advantageous effects.

For example, the wireless device may provide neighbor/candidate cell information to a network right after an expiry of a handover validity timer, the network can figure out the specific status of the wireless device to perform mobility. Further, the network can recognize which neighbor/candidate cells still have potential to perform a mobility and the network can make better decision to provide configuration on a handover.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) in a wireless communication system, the method comprising:
   receiving, from a network, a configuration for conditional mobility, wherein the configuration for conditional mobility comprises a corresponding mobility condition for each of multiple candidate cells;
   evaluating mobility conditions for the multiple candidate cells;
   based on the evaluation of a mobility condition for a target cell among the multiple candidate cells, starting a timer for a mobility attempt to the target cell;
   performing the mobility attempt to the target cell while the timer is running; and
   transmitting, to the network, report information based on a failure of the mobility attempt to the target cell, the failure of the mobility attempt to the target cell being related to an expiry of the timer,
   wherein the report information is transmitted based on an instruction received from the network,
   wherein the report information comprises candidate cell information for all of the multiple candidate cells based on the instruction, and
   wherein the report information comprises:
      a cell identity of the target cell that has failed the mobility attempt;
      a cell identity of at least one neighbor cell among the multiple candidate cells; and
      information informing that a mobility condition for the at least one neighbor cell has been fulfilled at a moment of the failure of the mobility attempt.

2. The method of claim 1, wherein the expiry of the timer results in the failure of the mobility attempt to the target cell, and
   wherein the timer starts running in response to performing the mobility attempt to the target cell.

3. The method of claim 1, further comprising:
   performing a measurement on the at least one neighbor cell during the mobility attempt to the target cell; and
   obtaining a result of the measurement on the at least one neighbor cell.

4. The method of claim 1, wherein the report information further comprises: at least one of
   a result of a measurement on the target cell;
   a result of a measurement on the at least one neighbor cell; or
   a time-to-trigger (TTT) counting status of the at least one neighbor cell.

5. The method of claim 1, further comprising:
   after transmitting the report information to the network, receiving, from the network, a mobility command for another target cell; and
   performing a mobility attempt to the other target cell.

6. The method of claim 1, wherein the configuration for conditional mobility comprises reporting conditions for the multiple candidate cells, further comprising:
   identifying a candidate cell for which a reporting condition is satisfied among the multiple candidate cells,
   wherein the report information comprises candidate cell information for the candidate cell, and
   wherein the report information excludes candidate cell information for other candidate cells for which a reporting condition is not satisfied among the multiple candidate cells.

7. The method of claim 6, wherein the reporting conditions comprise mobility events for multiple candidate cells, and
   wherein the identifying of the candidate cell comprises identifying the candidate cell for which an entering condition for a mobility event is satisfied among the multiple candidate cells.

8. The method of claim 6, wherein the reporting conditions comprise time-to-trigger (TTT) thresholds for the multiple candidate cells, and
   wherein the identifying of the candidate cell comprises:
      determining a time period during which an entering condition for a mobility event is satisfied for each of the multiple candidate cells; and
      identifying the candidate cell for which the time period is greater than or equal to a TTT threshold among the multiple candidate cells.

9. The method of claim 6, wherein the reporting conditions comprise offsets for the multiple candidate cells, and
   wherein the identifying of the candidate cell comprises identifying the candidate cell for which a signal quality is better than that for a source cell by more than or equal to an offset among the multiple candidate cells.

10. The method of claim 6, wherein the reporting conditions comprise thresholds for the multiple candidate cells, and
    wherein the identifying of the candidate cell comprises identifying the candidate cell for which a signal quality is better than a threshold among the multiple candidate cells.

11. The method of claim 1, wherein the UE is in communication with at least one of a mobile device, a network, or autonomous vehicles other than the UE.

12. A user equipment (UE) configured to operate in a wireless communication system, the UE comprising:
    a memory;
    a transceiver; and
    at least one processor operatively coupled to the memory and the transceiver, wherein the memory stores instructions that, based on being executed by the at least one processor, perform operations comprising:
       receiving, from a network, a configuration for conditional mobility, wherein the configuration for conditional mobility comprises a corresponding mobility condition for each of multiple candidate cells;
       evaluating mobility conditions for the multiple candidate cells based on the evaluation of a mobility condition for a target cell among the multiple candidate cells, starting a timer for a mobility attempt to the target cell;
       performing the mobility attempt to the target cell while the timer is running; and
       transmitting, to the network, report information based on a failure of the mobility attempt to the target cell, the failure of the mobility attempt to the target cell being related to an expiry of the timer, wherein the report information is transmitted based on an instruction received from the network, wherein the report information comprises candidate cell information for all of the multiple candidate cells based on the instruction, and wherein the report information comprises:
- a cell identity of the target cell that has failed the mobility attempt;
- a cell identity of at least one neighbor cell among the multiple candidate cells; and
- information informing that a mobility condition for the at least one neighbor cell has been fulfilled at a moment of the failure of the mobility attempt.

13. A non-transitory computer-readable medium having recorded thereon a program for performing each step of a method on a computer, the method comprising:

receiving, from a network, a configuration for conditional mobility, wherein the configuration for conditional mobility comprises a corresponding mobility condition for each of multiple candidate cells;

evaluating mobility conditions for the multiple candidate cells;

based on the evaluation of a mobility condition for a target cell among the multiple candidate cells, starting a timer for a mobility attempt to the target cell;

performing the mobility attempt to the target cell while the timer is running; and transmitting, to the network, report information based on a failure of the mobility attempt to the target cell, the failure of the mobility attempt to the target cell being related to an expiry of the timer, wherein the report information is transmitted based on an instruction received from the network, wherein the report information comprises candidate cell information for all of the multiple candidate cells based on the instruction, and wherein the report information comprises:
- a cell identity of the target cell that has failed the mobility attempt;
- a cell identity of at least one neighbor cell among the multiple candidate cells; and
- information informing that a mobility condition for the at least one neighbor cell has been fulfilled at a moment of the failure of the mobility attempt.

* * * * *